US010977807B2

(12) United States Patent
Whang et al.

(10) Patent No.: US 10,977,807 B2
(45) Date of Patent: Apr. 13, 2021

(54) METHOD AND APPARATUS FOR EXTRACTING OF FACIAL MOVEMENT INFORMATION

(71) Applicant: SANGMYUNG UNIVERSITY INDUSTRY-ACADEMY COOPERATION FOUNDATION, Seoul (KR)

(72) Inventors: Min Cheol Whang, Gyeonggi-do (KR); Sung Teac Hwang, Seoul (KR); Myoung Ju Won, Chungcheongnam-do (KR); Dong Won Lee, Gyeonggi-do (KR)

(73) Assignee: SANGMYUNG UNIVERSITY INDUSTRY-ACADEMY COOPERATION FOUNDATION

( * ) Notice: Subject to any disclaimer, the term of this patent is extended or adjusted under 35 U.S.C. 154(b) by 27 days.

(21) Appl. No.: 16/524,840

(22) Filed: Jul. 29, 2019

(65) Prior Publication Data
US 2020/0118276 A1    Apr. 16, 2020

(30) Foreign Application Priority Data
Jul. 25, 2018    (KR) .................. 10-2018-0086766

(51) Int. Cl.
*G06T 7/246*    (2017.01)
*G06T 5/00*    (2006.01)

(52) U.S. Cl.
CPC .............. *G06T 7/246* (2017.01); *G06T 5/002* (2013.01); *G06T 2207/30201* (2013.01)

(58) Field of Classification Search
CPC ........... G06T 7/246; G06T 2207/30201; G06T 5/002; G06T 2207/10016; G06T 2207/30232; G06T 7/70
See application file for complete search history.

(56) References Cited

U.S. PATENT DOCUMENTS

| 6,542,625 | B1 * | 4/2003 | Lee ................... | G06K 9/00228 |
| | | | | 348/169 |
| 9,098,760 | B2 | 8/2015 | Saito et al. | |
| 9,104,908 | B1 * | 8/2015 | Rogers ............... | G06K 9/00315 |
| 2013/0070973 | A1 * | 3/2013 | Saito .................. | G06K 9/00228 |
| | | | | 382/118 |
| 2016/0078279 | A1 * | 3/2016 | Pitre ........................ | G06T 7/11 |
| | | | | 382/118 |
| 2017/0061198 | A1 * | 3/2017 | Choi .................. | G06K 9/00268 |
| 2017/0323072 | A1 * | 11/2017 | Hwang ............... | A61B 5/0077 |

FOREIGN PATENT DOCUMENTS

| JP | 2013065119 | 4/2013 |
| KR | 20000050399 | 8/2000 |
| KR | 2016013261 | 11/2016 |

\* cited by examiner

*Primary Examiner* — Edward F Urban
*Assistant Examiner* — Wassim Mahrouka
(74) *Attorney, Agent, or Firm* — Perman & Green, LLP

(57) ABSTRACT

A method of extracting facial movement information capable of effectively canceling noise includes: obtaining an image of a subject's face with a camera; extracting raw data on facial movement from the image; detecting macro movement data from the raw data; and removing the macro movement component from the raw data to obtain refined micro movement data.

10 Claims, 24 Drawing Sheets

(Regression Trend)

(Moving Average Trend)

(Moving Average Trend)

METHOD AND APPARATUS FOR EXTRACTING OF FACIAL MOVEMENT INFORMATION

CROSS-REFERENCE TO RELATED APPLICATION

This application claims the benefit of Korean Patent Application No. 10-2018-0086766, filed on Jul. 25, 2018, in the Korean Intellectual Property Office, the disclosures of which are incorporated herein in their entirety by reference.

BACKGROUND

1. Field

One or more embodiments relate to a method and an apparatus for extracting facial movement information, and more particularly, to a method and an apparatus for extracting facial movement information that effectively cancels noise from facial image information.

2. Description of the Related Art

Non-invasive physiological information and emotional information extraction techniques using facial movement information are being studied. Facial movement information is obtained through image capturing and image processing. Facial movement information includes vertex or movement information of a landmark defined with respect to a face. In order to accurately extract such movement information, it is necessary to detect a face region accurately and to detect a specific region in the face region. However, the detected information includes, as noise, movement information such as background and head movement in addition to the movement occurring in the real face. In order to detect the accurate facial movement information, it is necessary to remove such unnecessary movement information, and thus research is required in this respect.

SUMMARY

One or more embodiments include a method and an apparatus for extracting facial movement information that effectively cancels noise from facial image information.

Additional aspects will be set forth in part in the description which follows and, in part, will be apparent from the description, or may be learned by practice of the presented embodiments.

According to one or more embodiments, a method of extracting facial movement information includes: obtaining an image of a subject's face with a camera; extracting raw data on facial movement from the image; detecting macro movement data from the raw data; and removing the macro movement component from the raw data to obtain refined micro movement data.

According to one or more embodiments, an apparatus for extracting facial movement information includes: a camera for capturing an image of a face of a subject; a processing device for processing the image of the face from the camera according to the method of claim 1; and a display for displaying a result of processing of a signal of the image.

The extracting of the raw data may include: defining one or more landmarks on a face of the subject; and tracking movement of the one or more landmarks in the image, wherein the raw data is obtained from movement information of at least one landmark designated on the face of the subject.

Movement data of the one or more landmarks may be extracted from a difference between coordinates of corresponding landmarks in front and rear frames. Also, the macro movement data may be extracted from trend data extracted by a moving average method using raw data of a certain window size (time interval). Further, the window size (time interval) may be in the range of about 1.5 seconds to about 2.5 seconds.

Trend data (Dt) and detrend data (Ddt) may be obtained from sample data (Pm) by the following Equation to cancel noise due to macro movement from the raw data:

$$Dt = \frac{Pm + Pm_{+1} + \ldots + Pm_{+n}}{size}$$

$$= \frac{1}{n}\sum_{i=size}^{n} Pm - i$$

$$idx = (size/2) + 1$$

$$Ddt = \left(\sum_{i=time}^{n}(Dr[idx]/Dt[idx]) - 1\right)^{idx+time}$$

$Pm$ = sample data (raw data = Frame distace)

size = window size × 30 fps $idx$ = Centered Moving Average index time = Real Time Input

BRIEF DESCRIPTION OF THE DRAWINGS

These and/or other aspects will become apparent and more readily appreciated from the following description of the embodiments, taken in conjunction with the accompanying drawings in which:

A-1 and A-2 in FIG. 1 illustrate a graph showing the amount of macro movement according to the progress of frames (time flow), and facial expressions related thereto, respectively;

Figure 2:
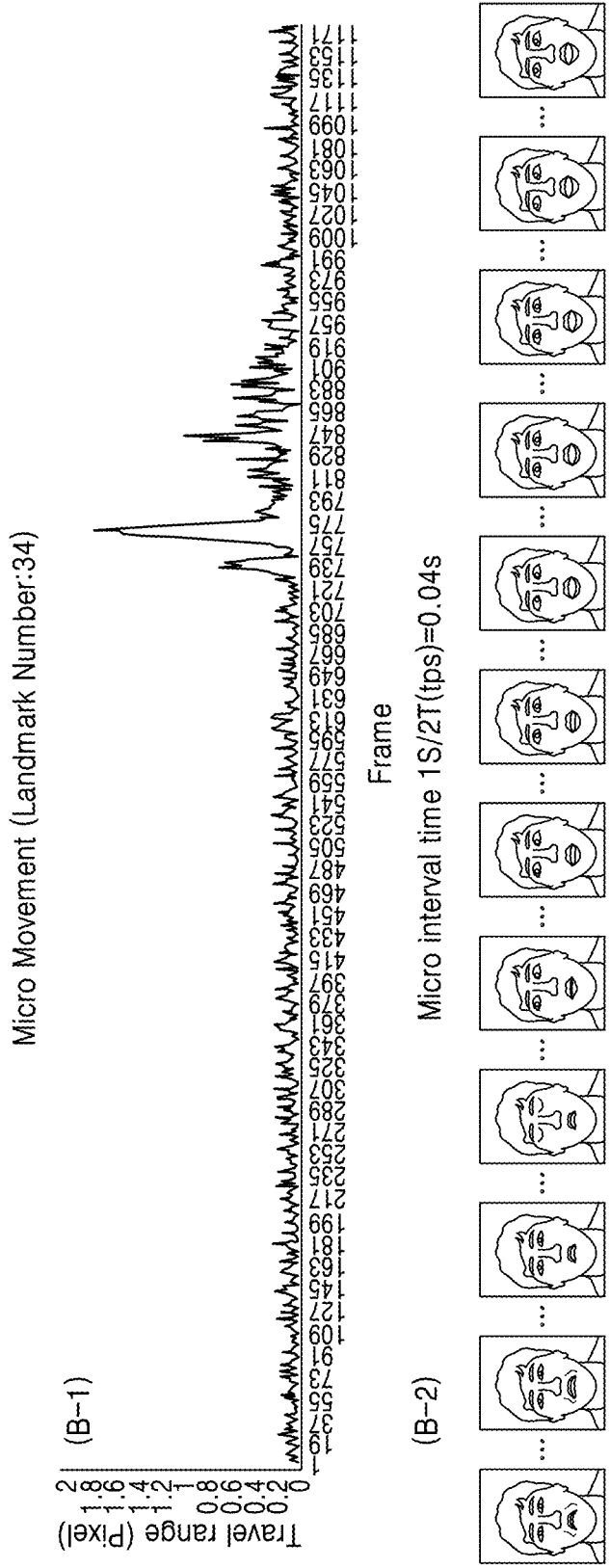
Figure 3:
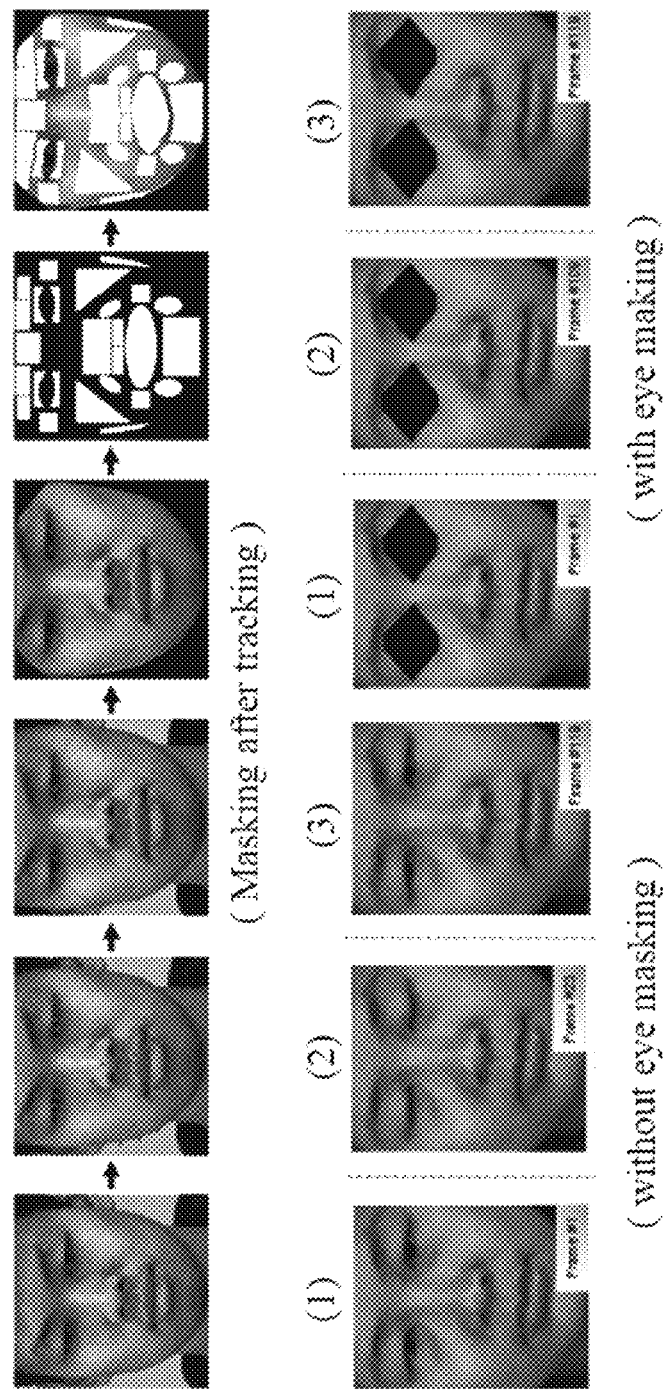
Figure 4:
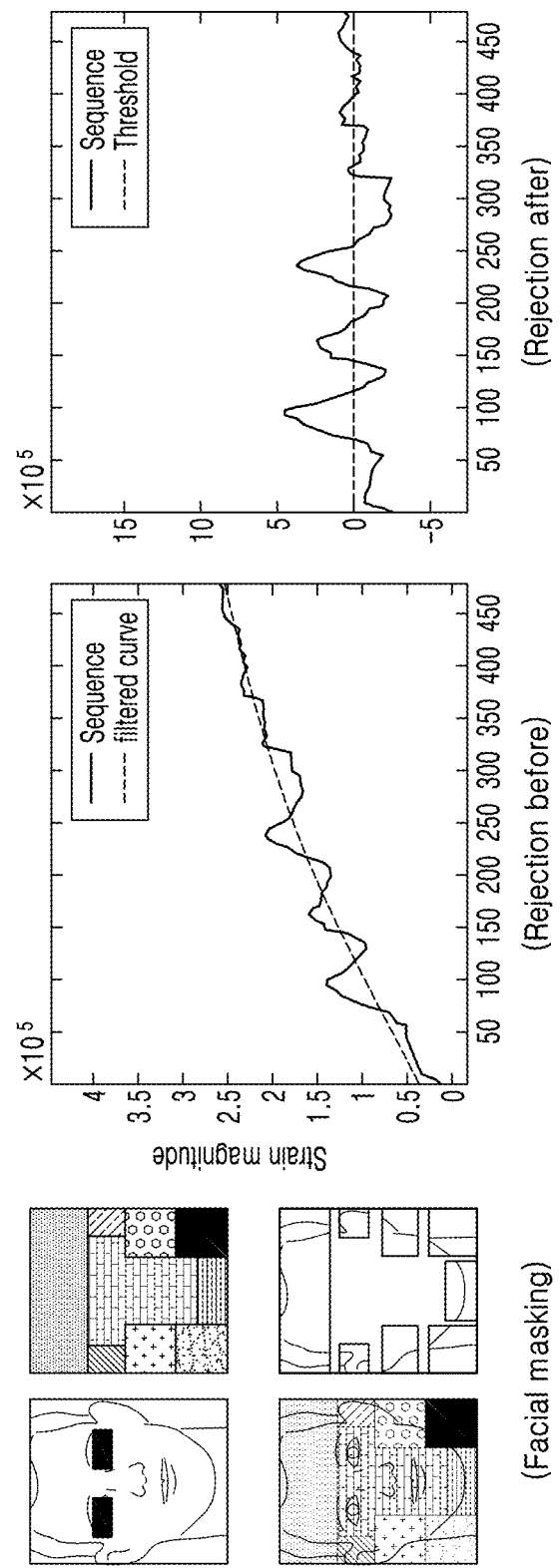
Figure 5:
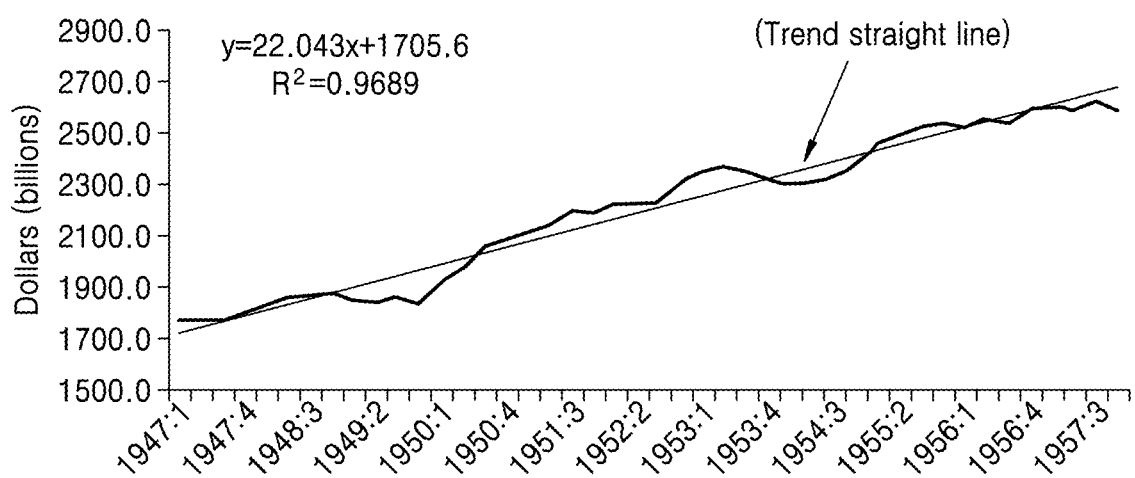
Figure 5:
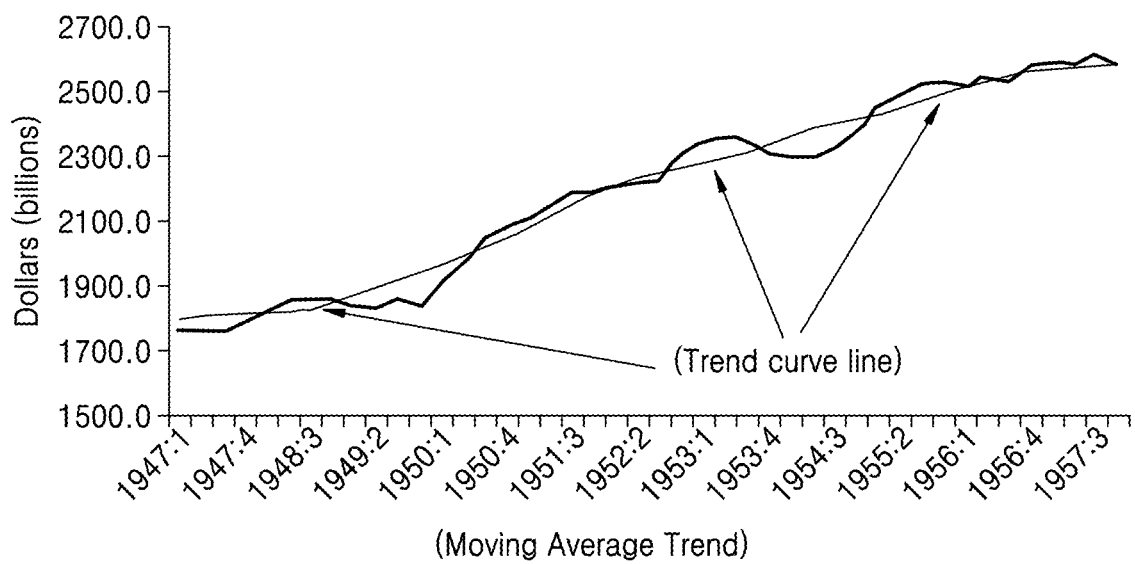
Figure 6:
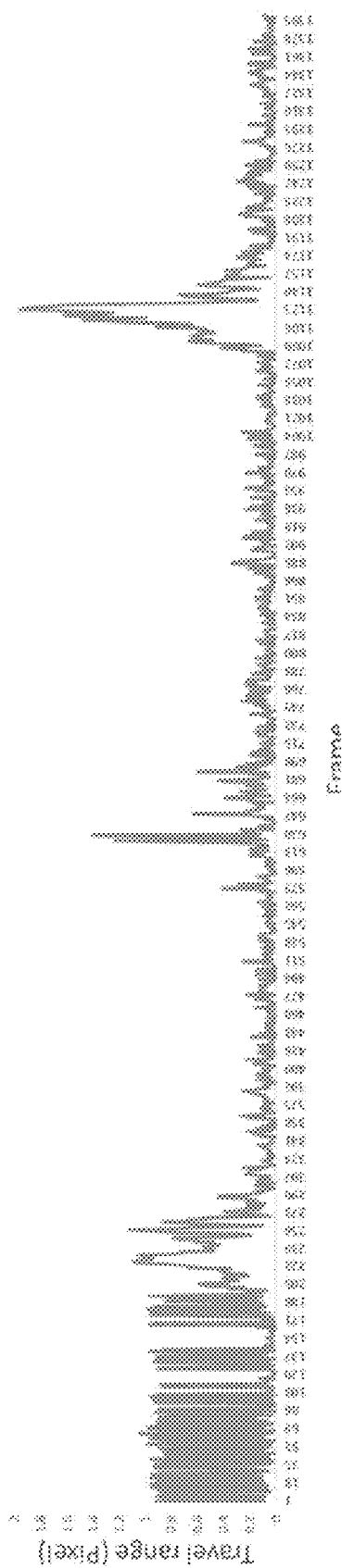
Figure 6:
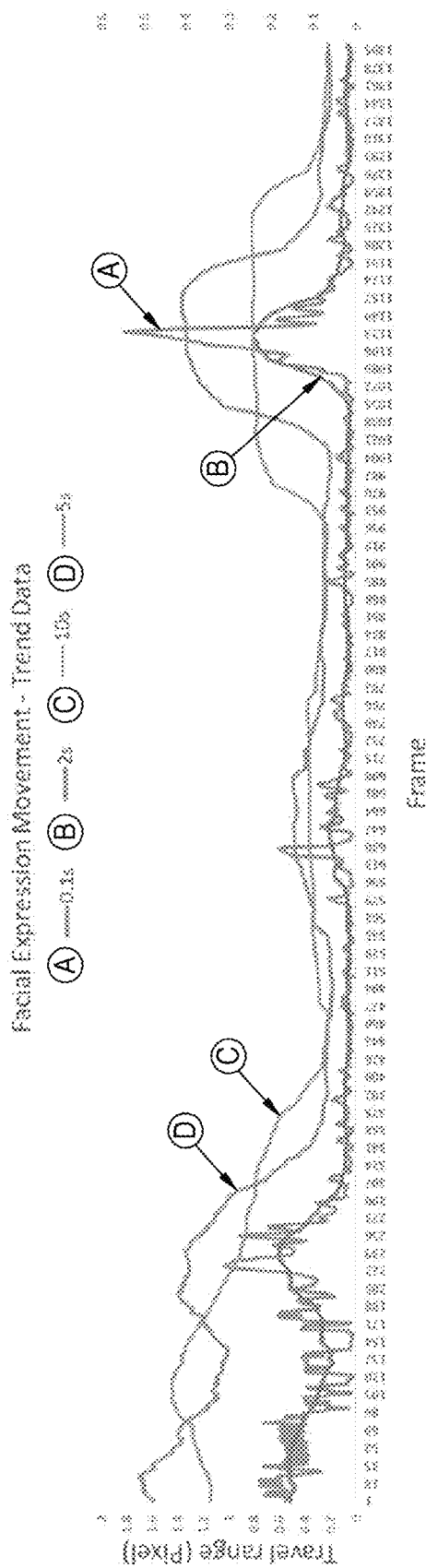
Figure 7:
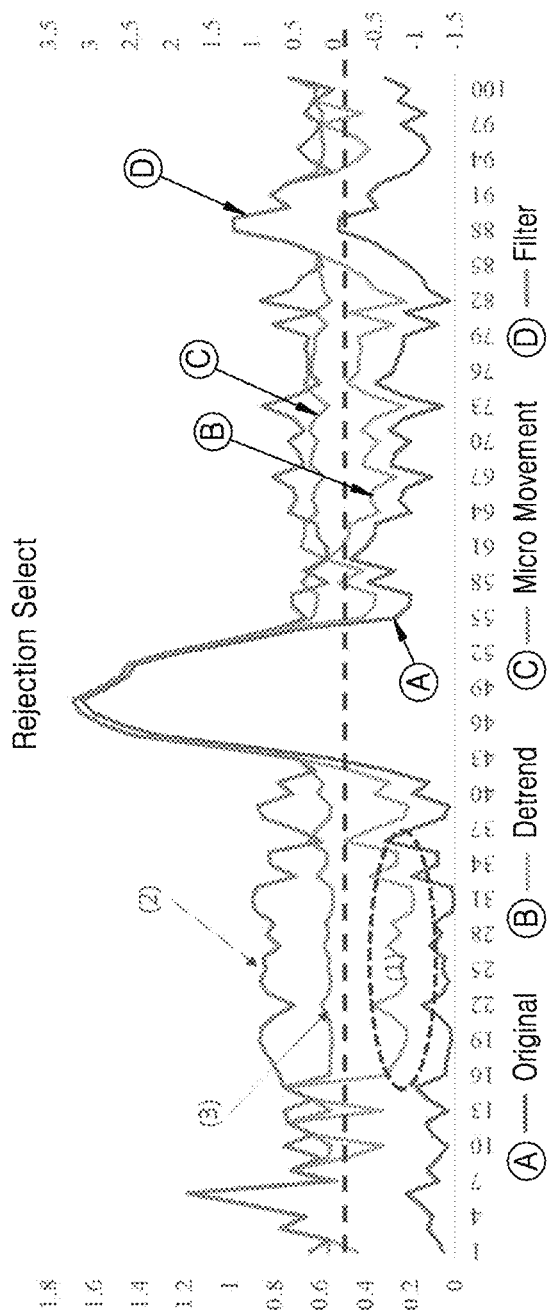
Figure 8:
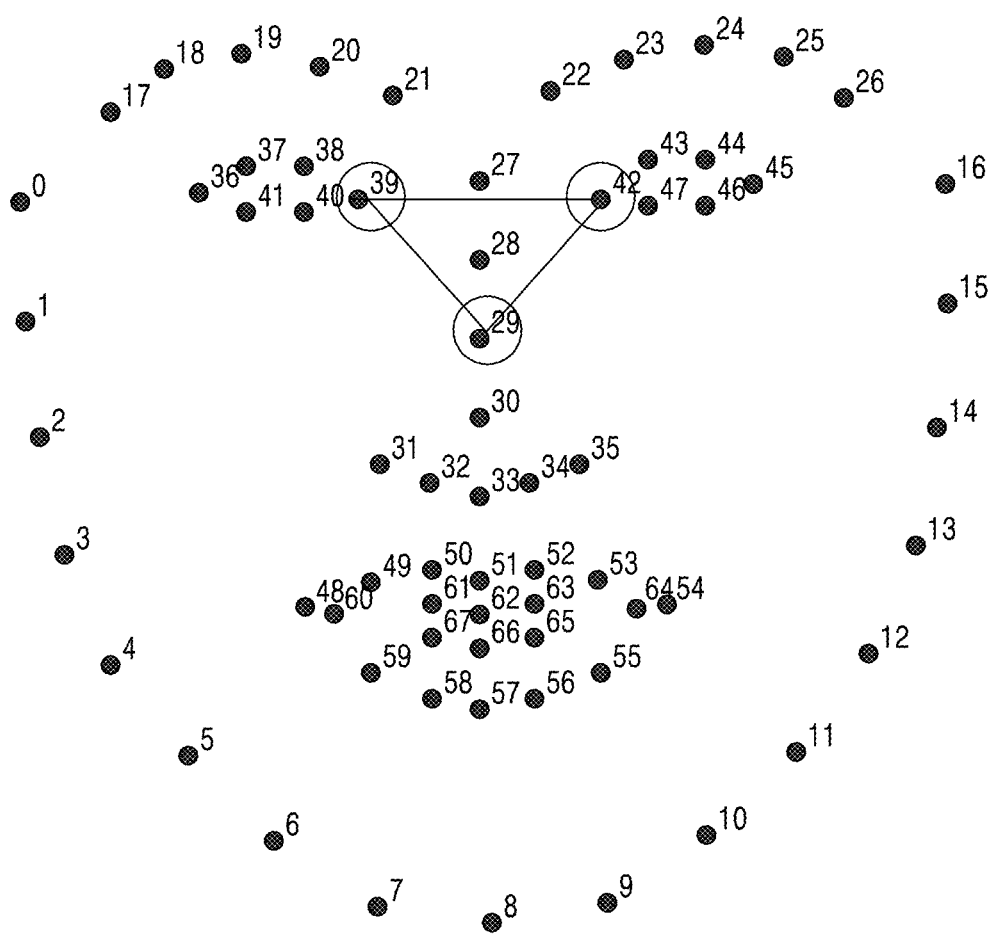
Figure 9:
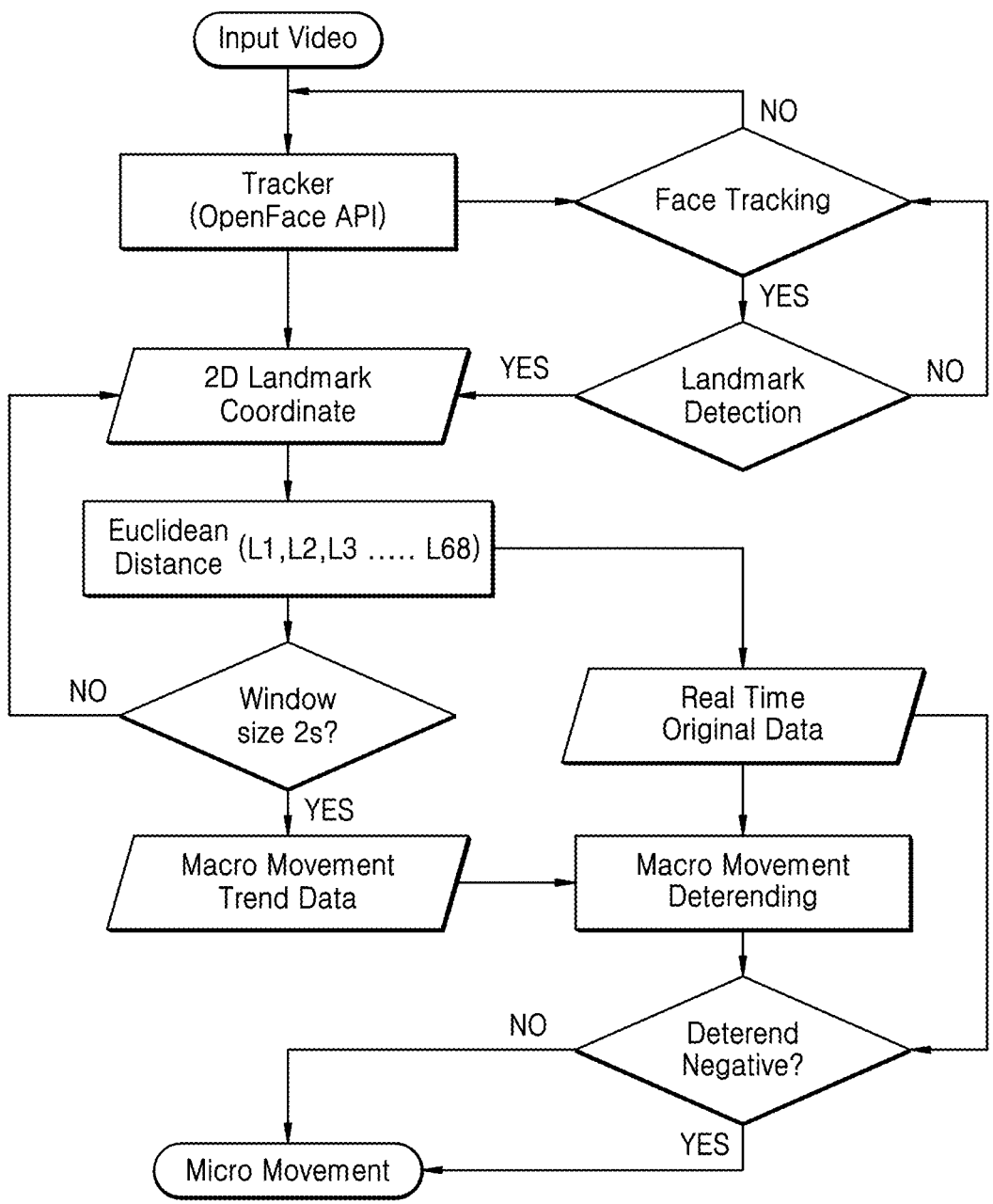
Figure 10:
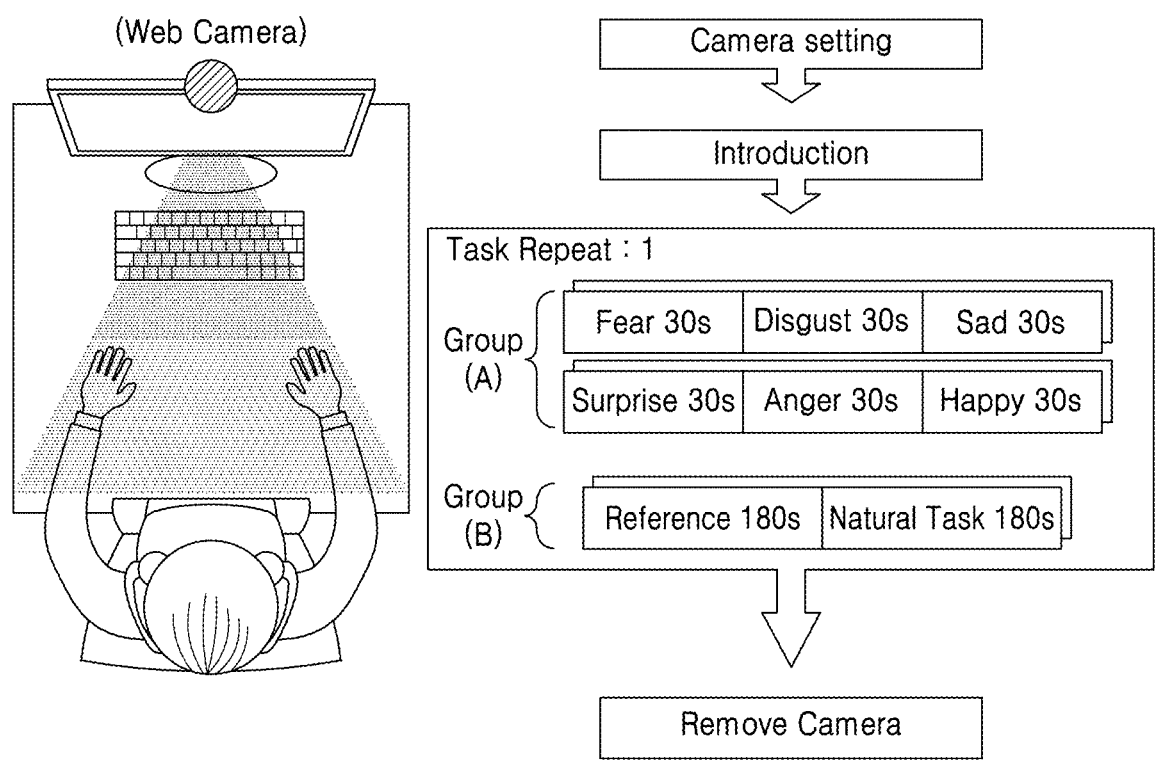
Figure 11:
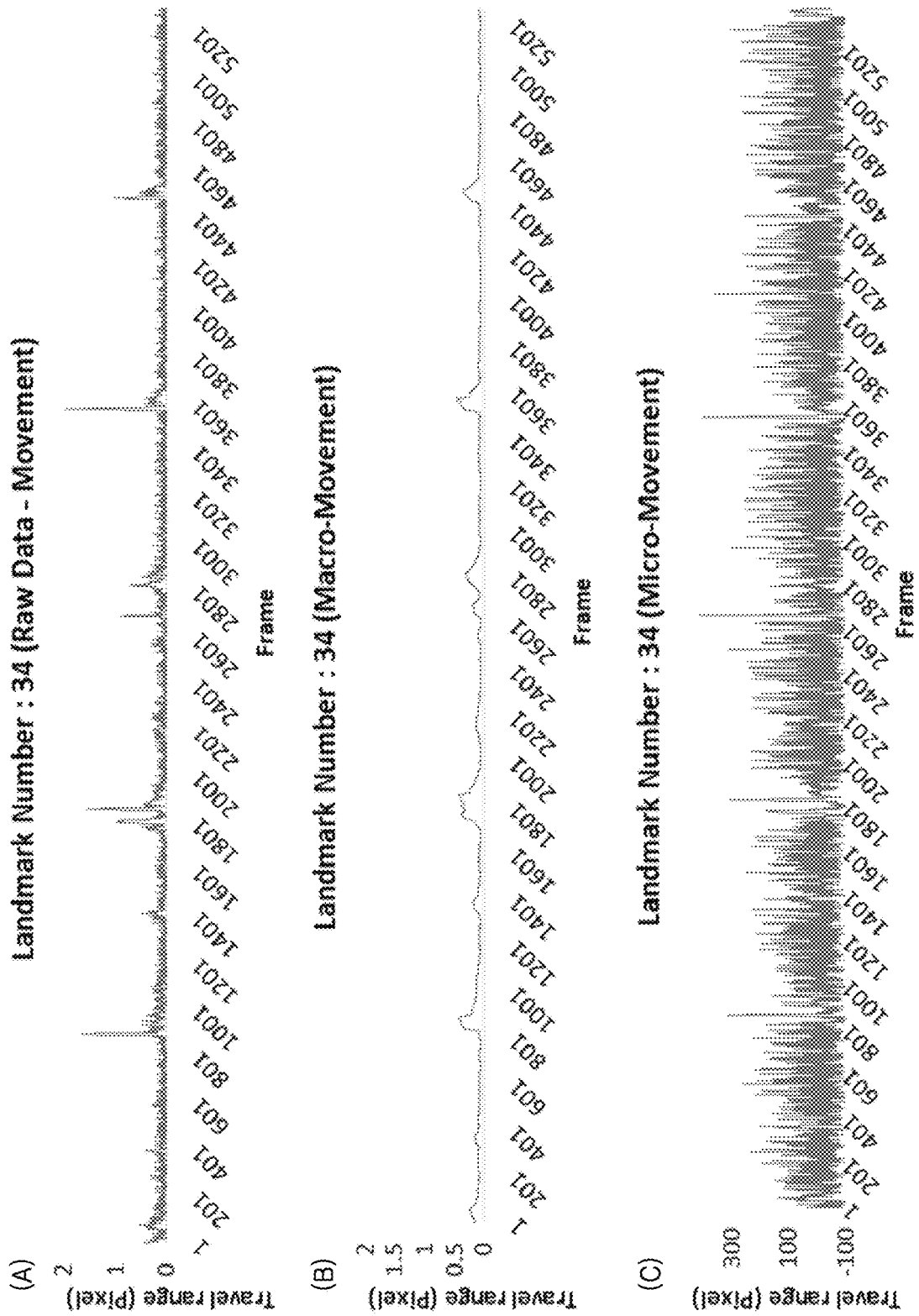
Figure 12:
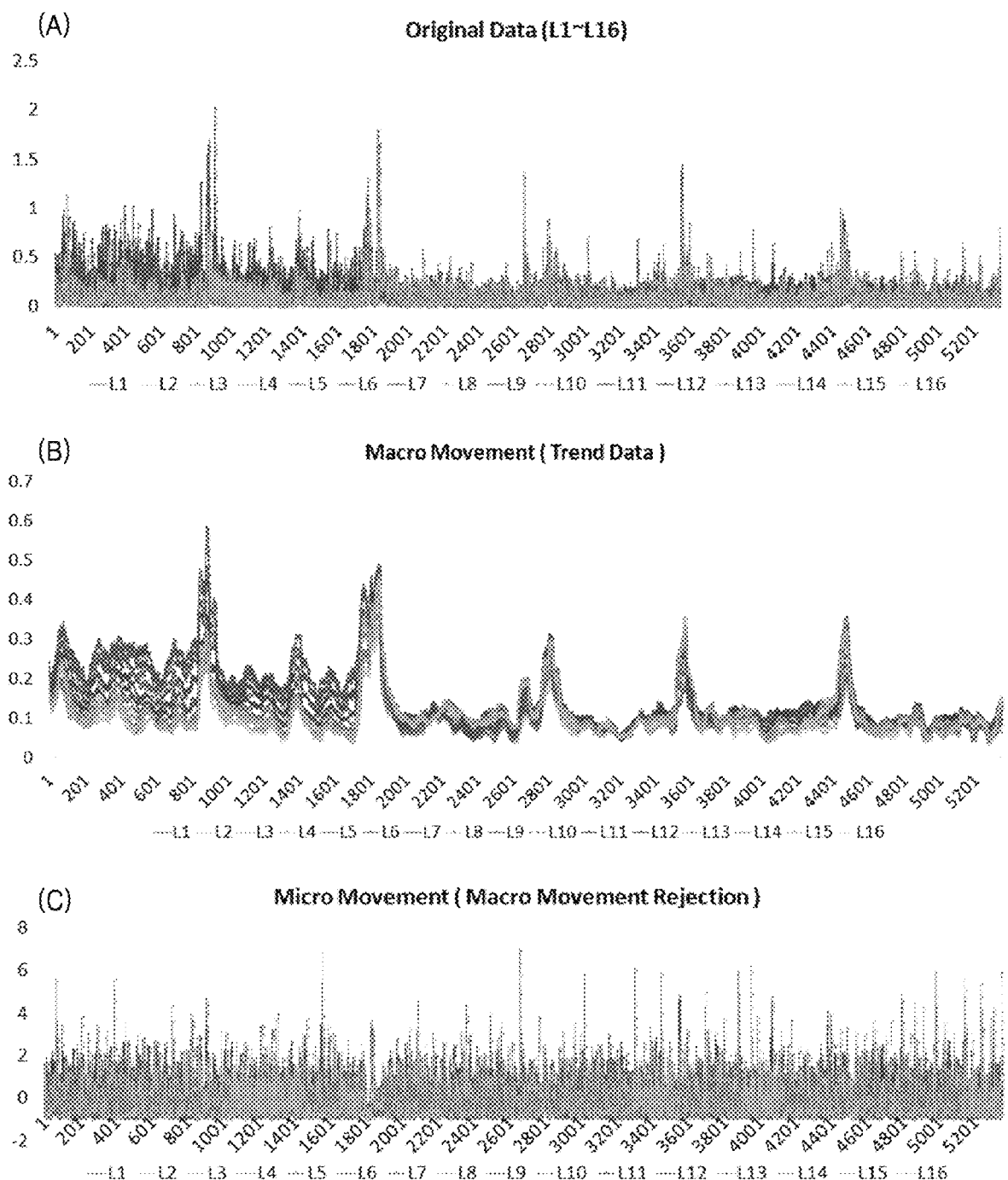
Figure 13:
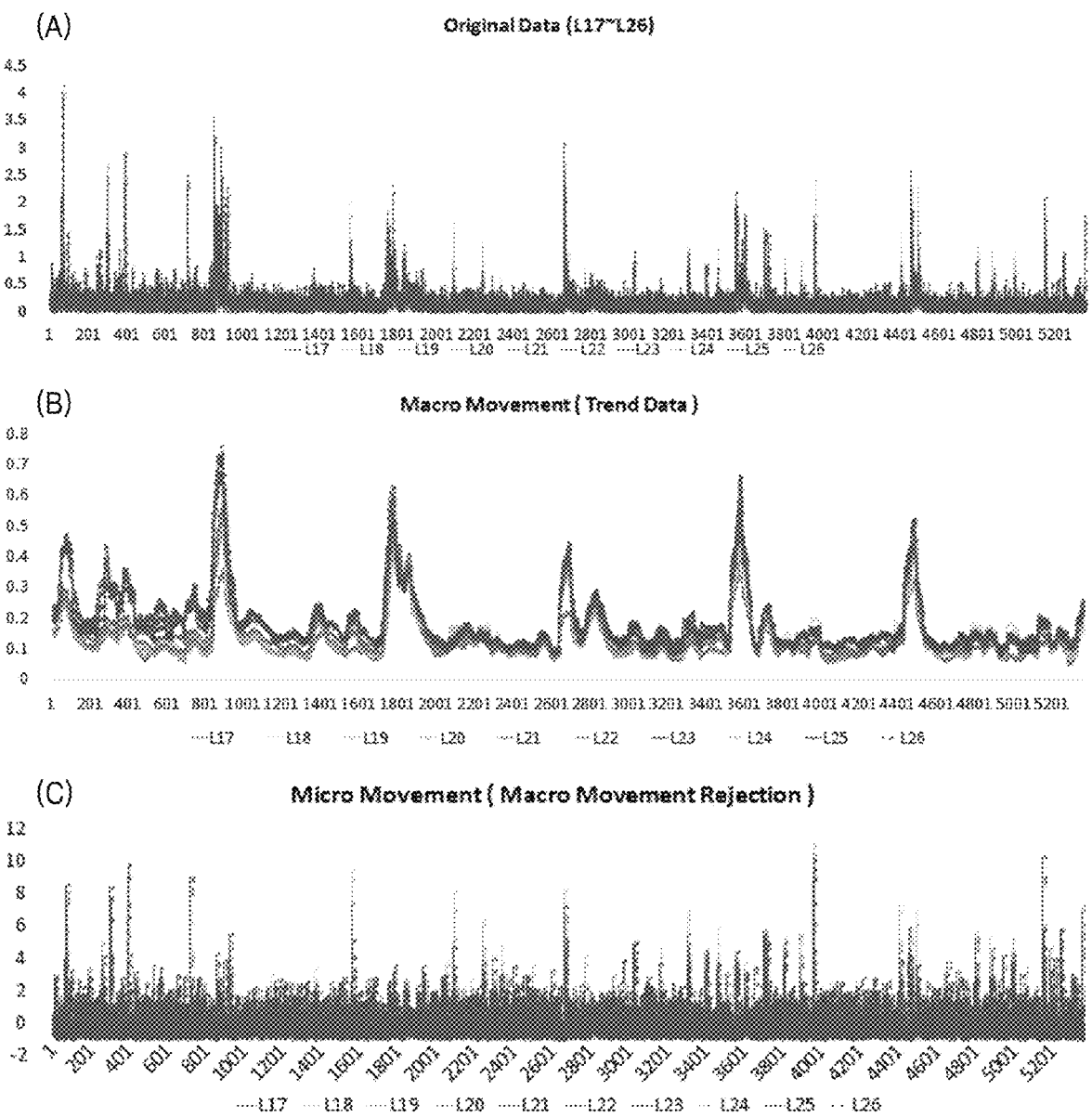
Figure 14:
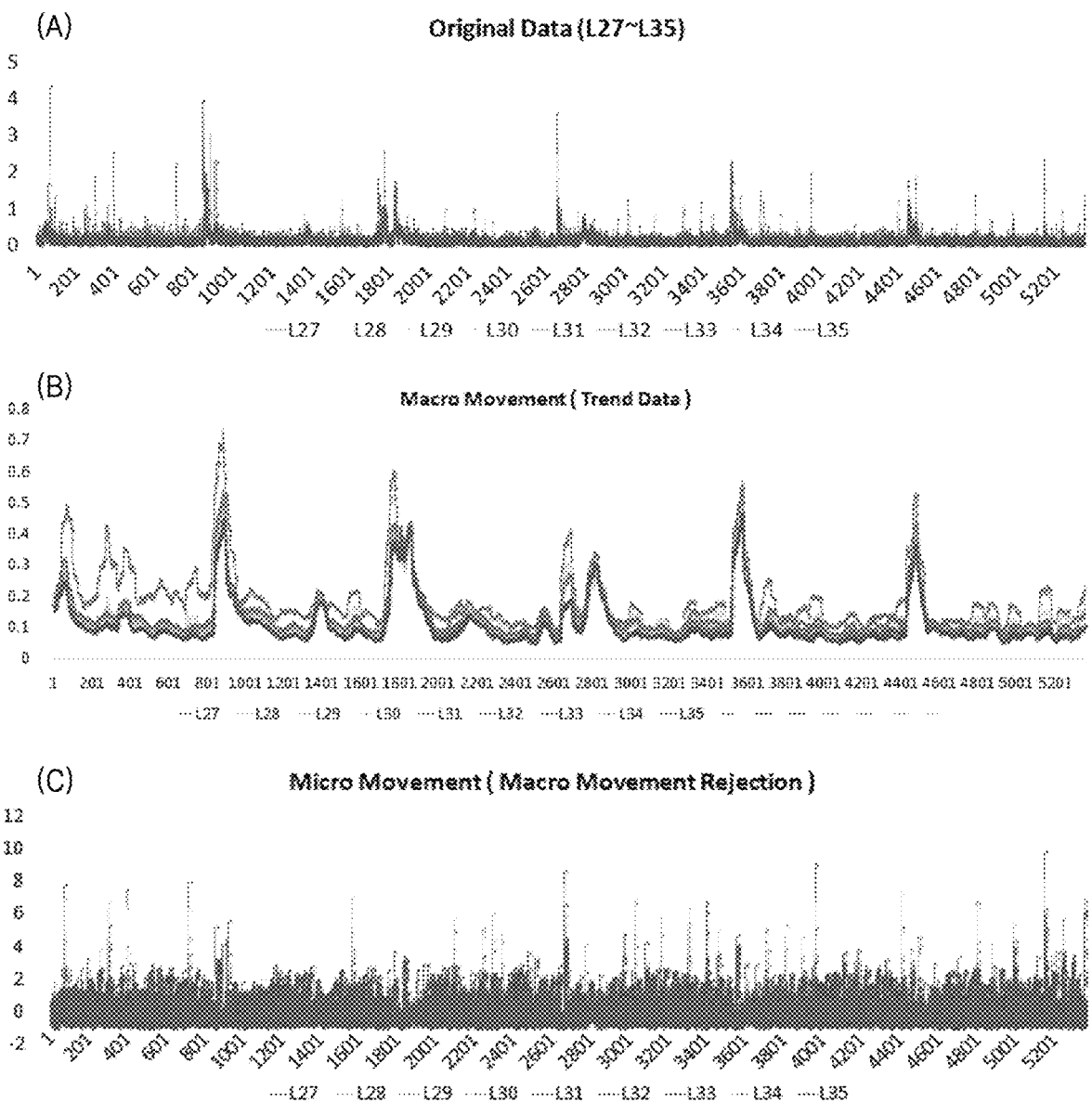
Figure 15:
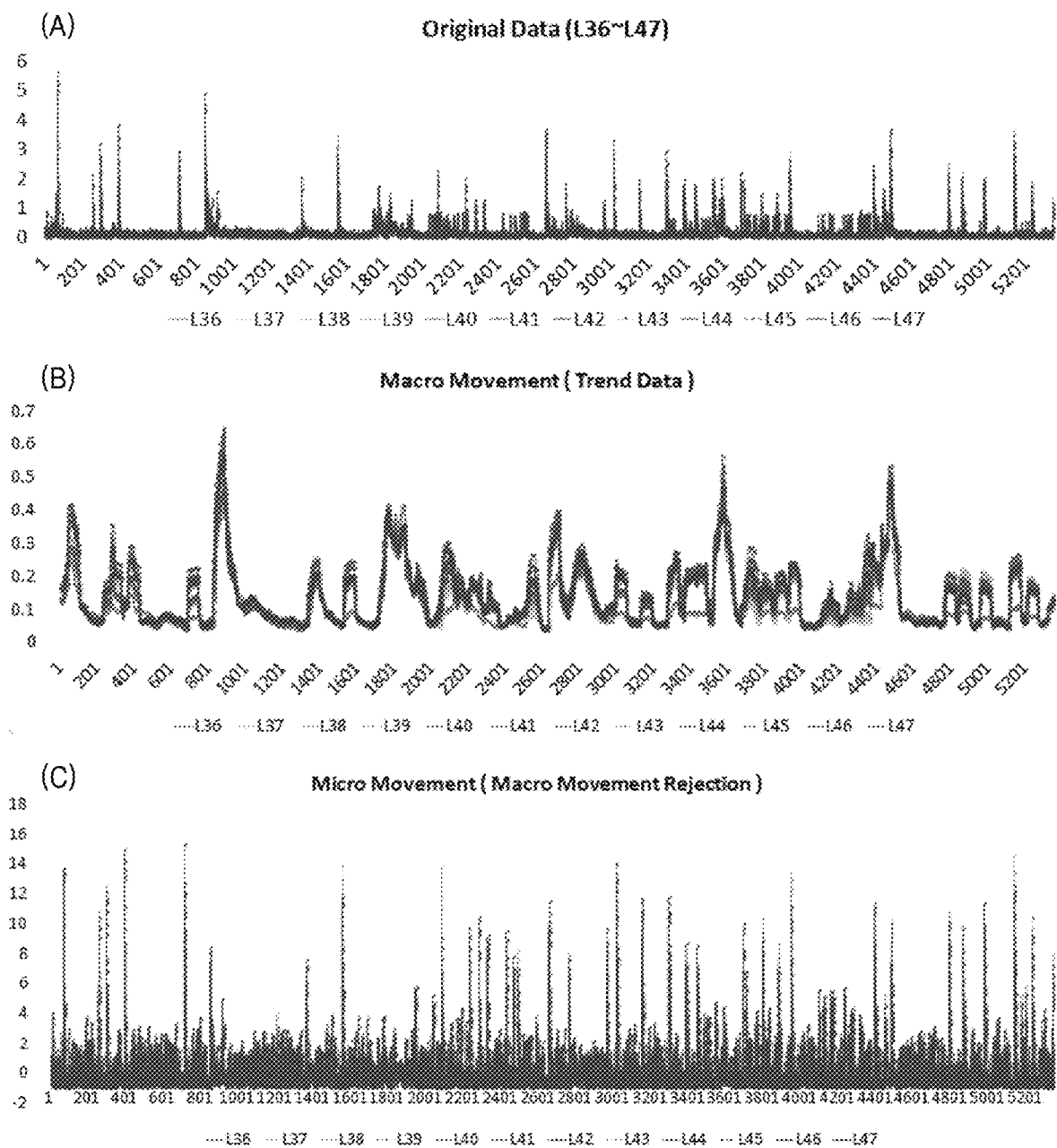
Figure 16:
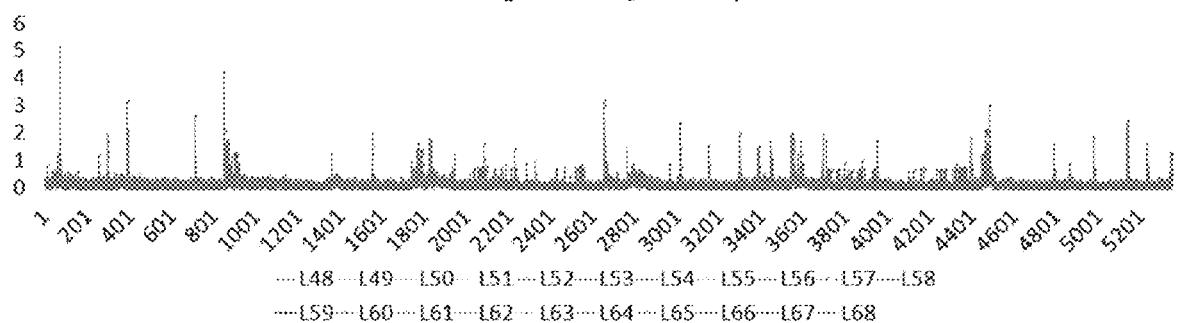
Figure 16:
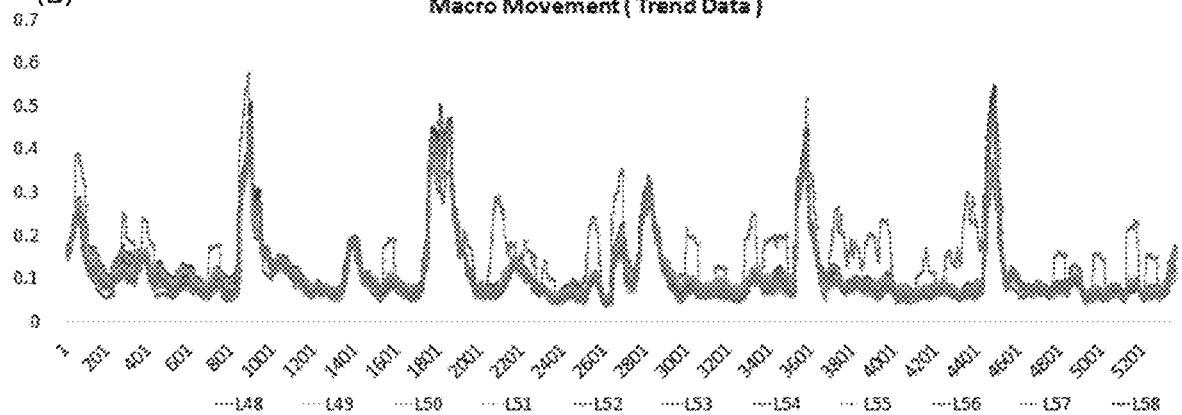
Figure 16:
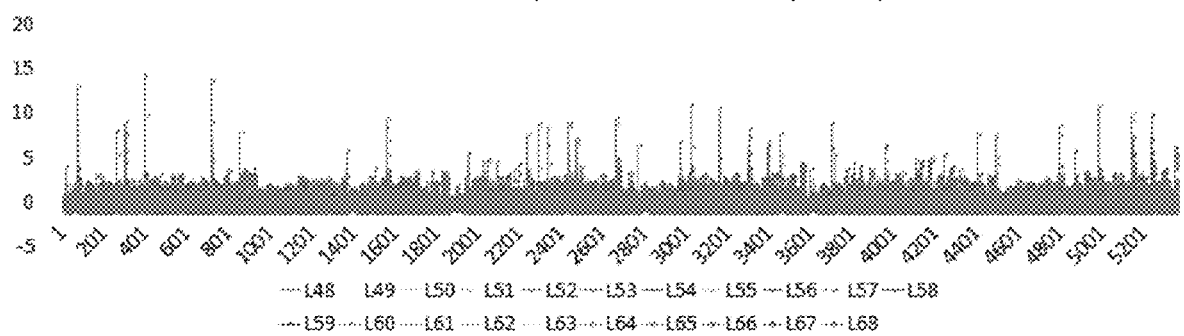
Figure 17:
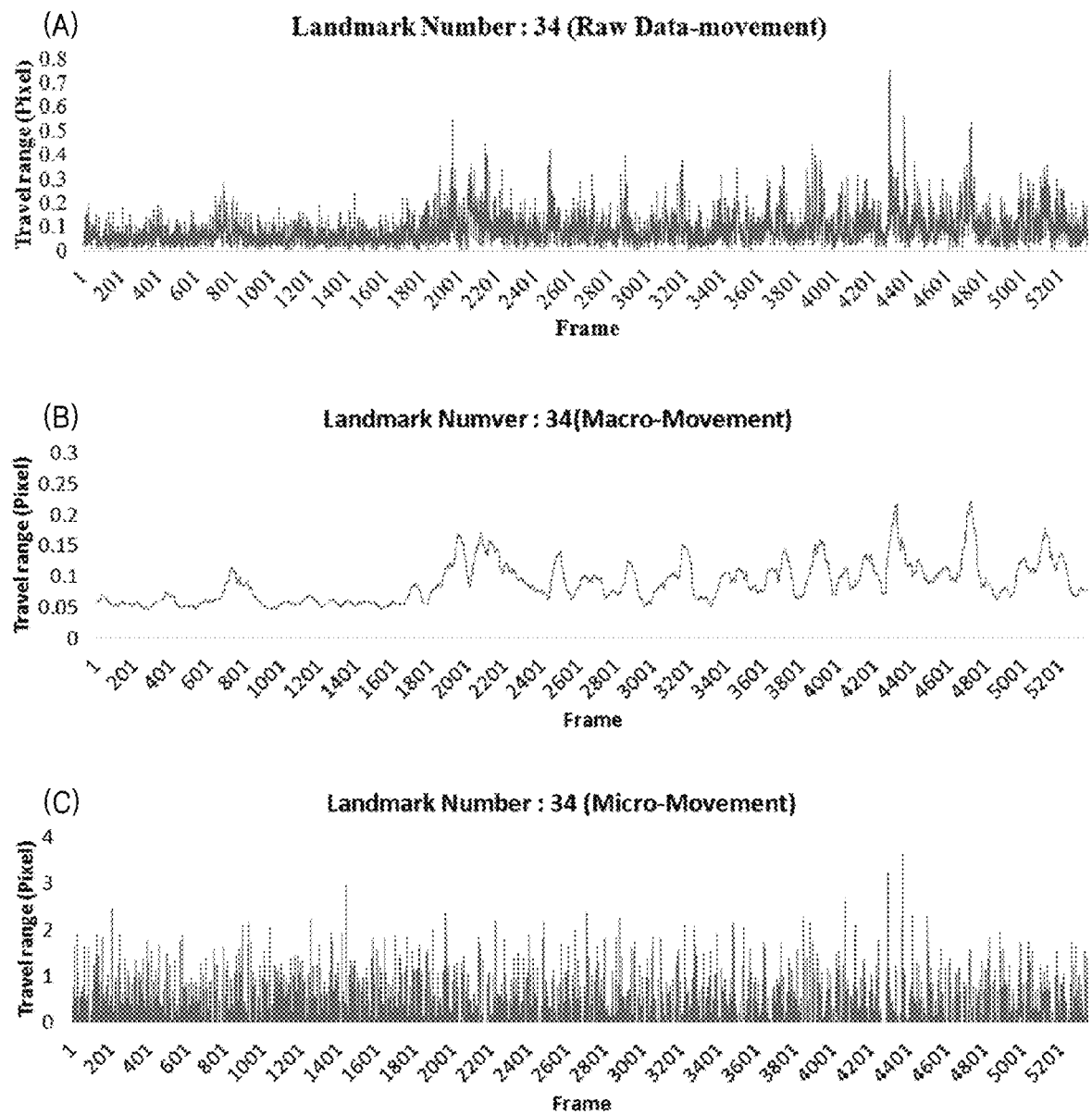
Figure 18:
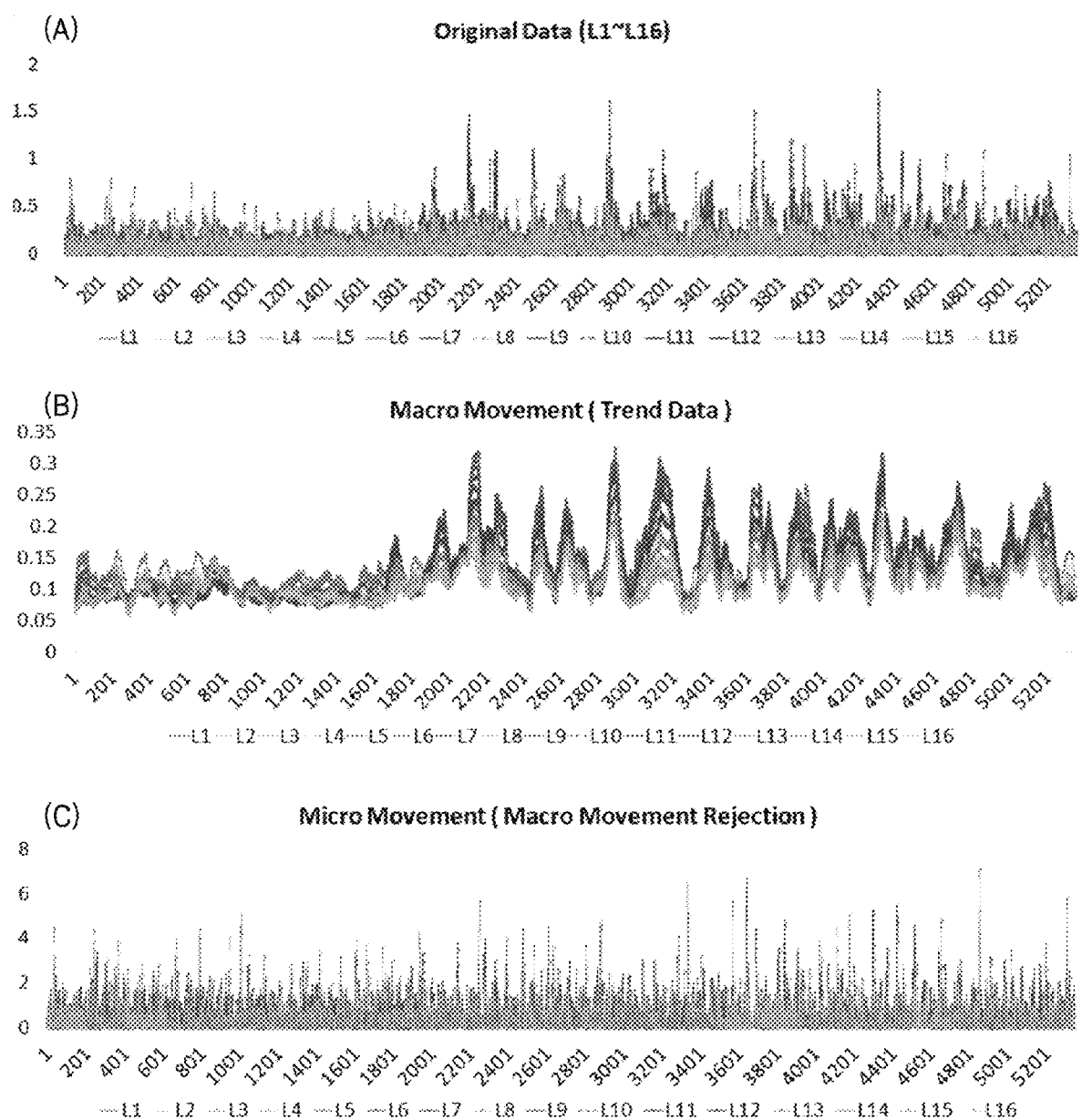
Figure 19:
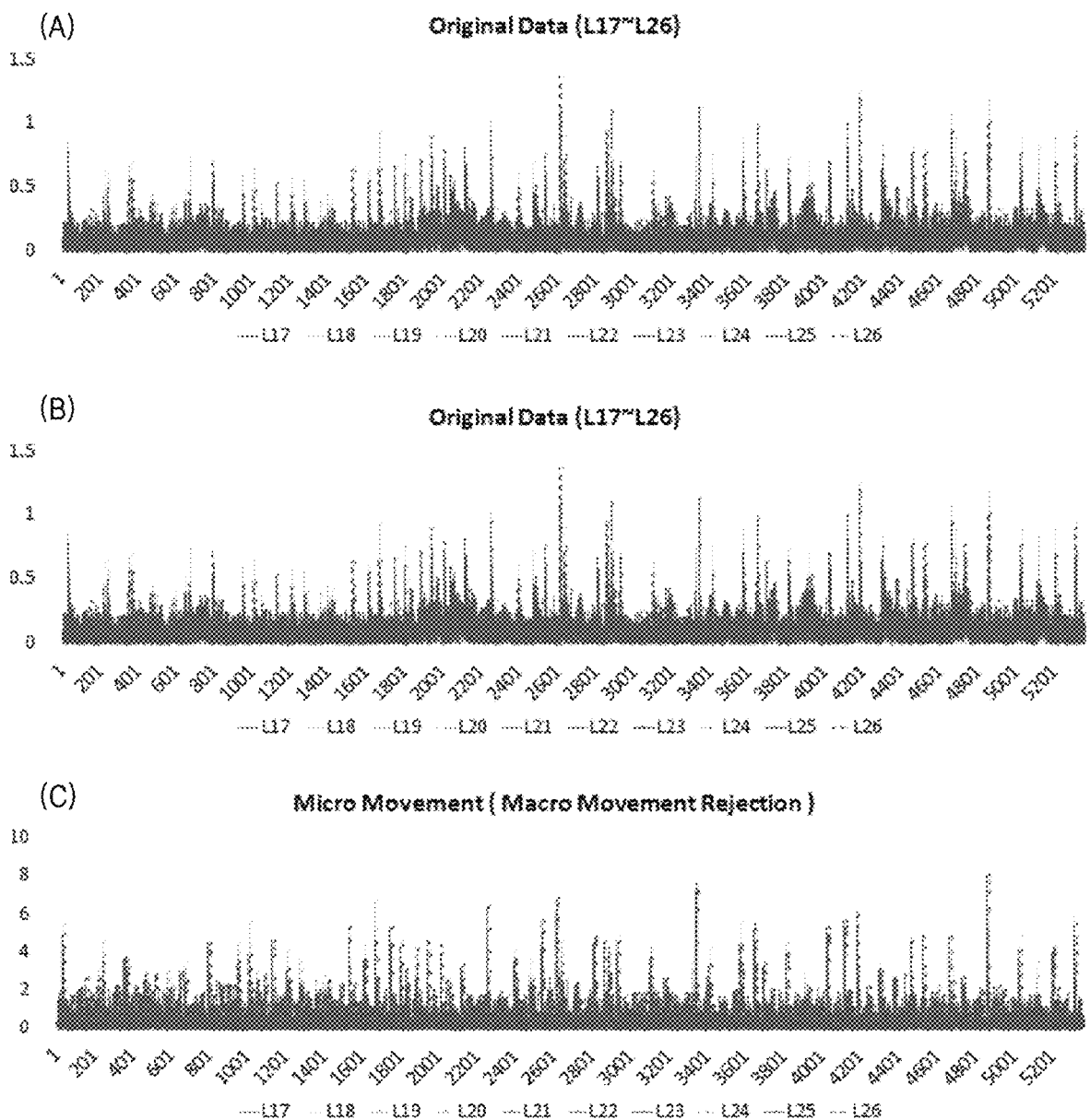
Figure 20:
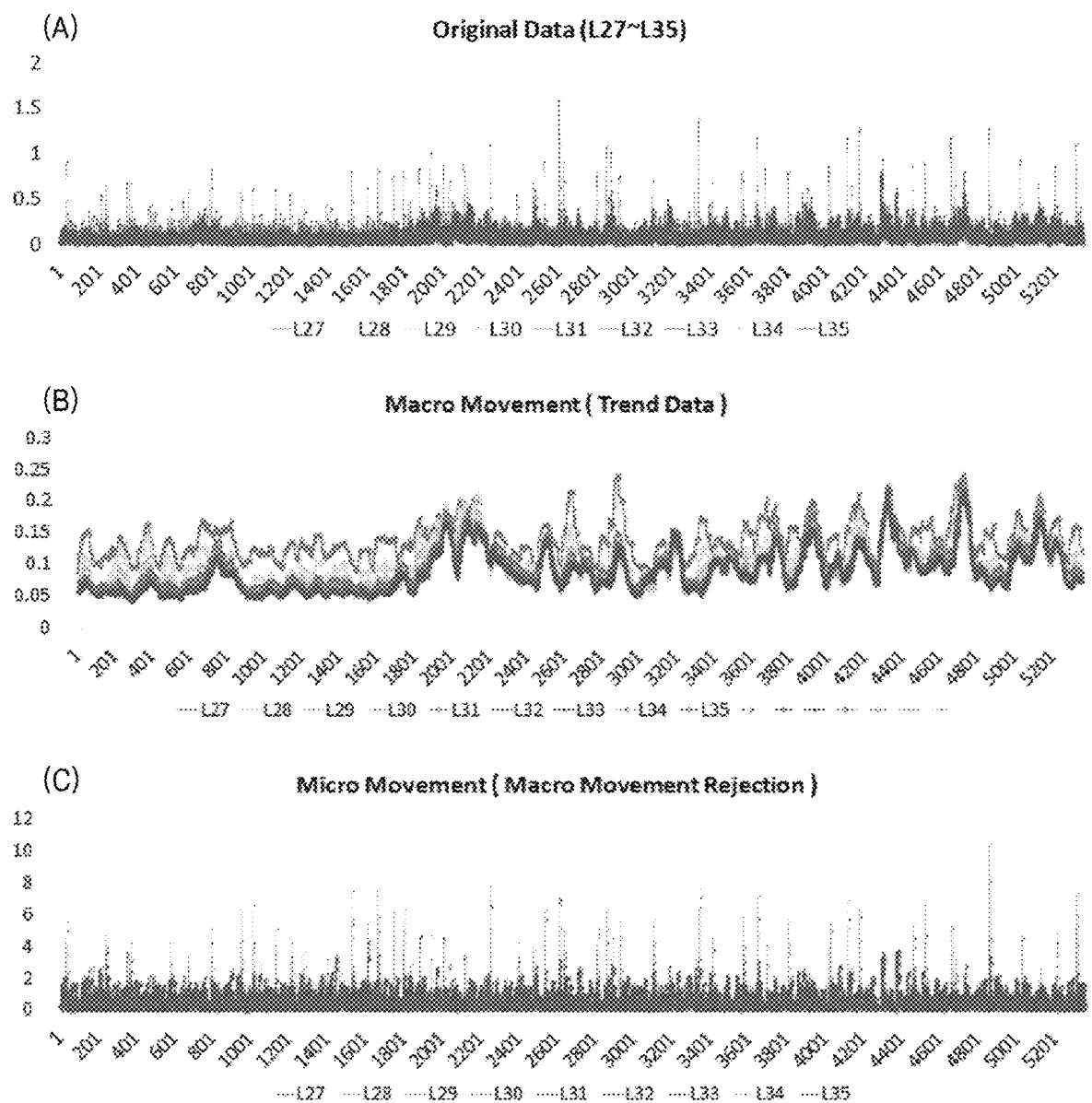
Figure 21:
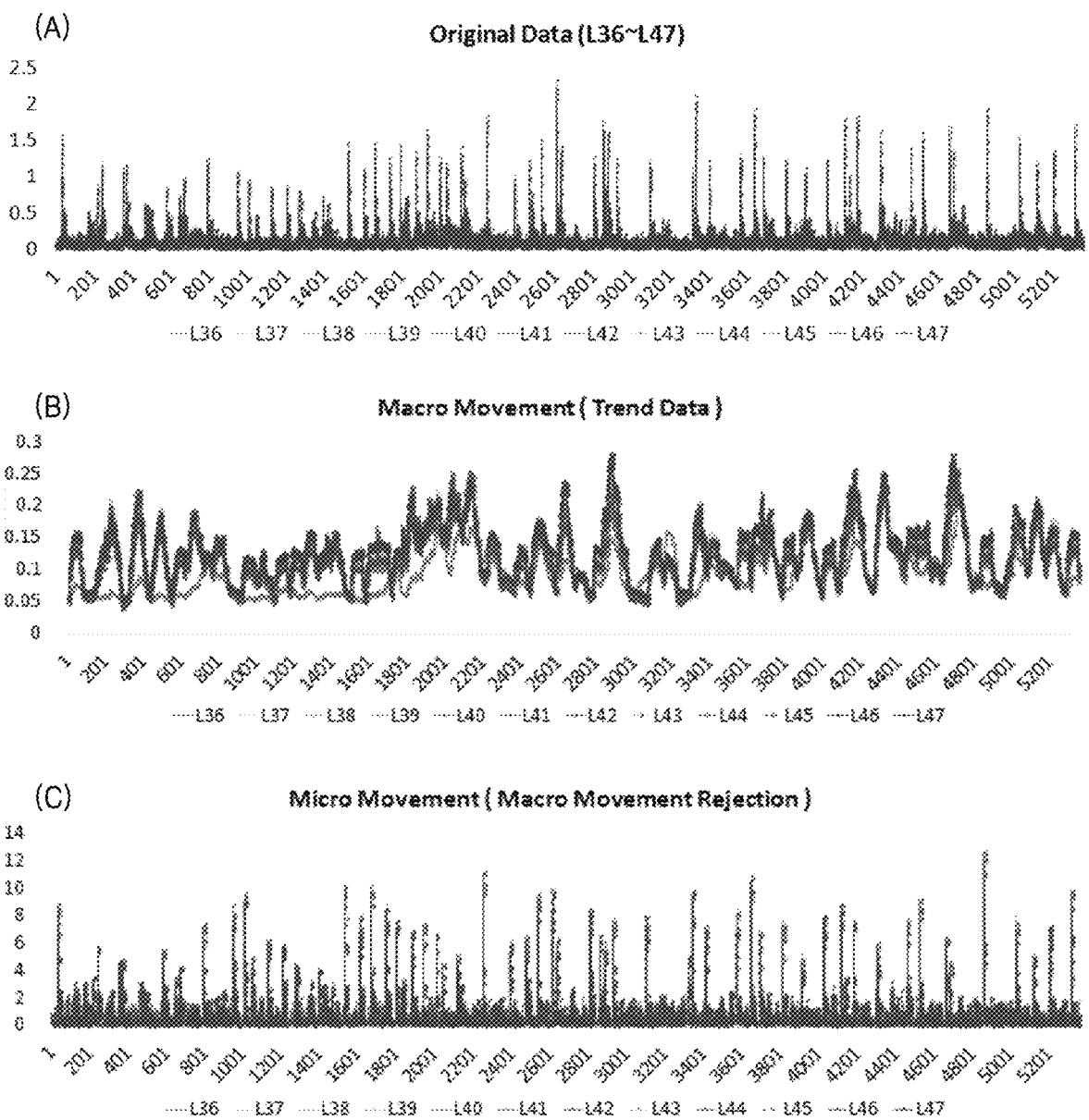
Figure 22:
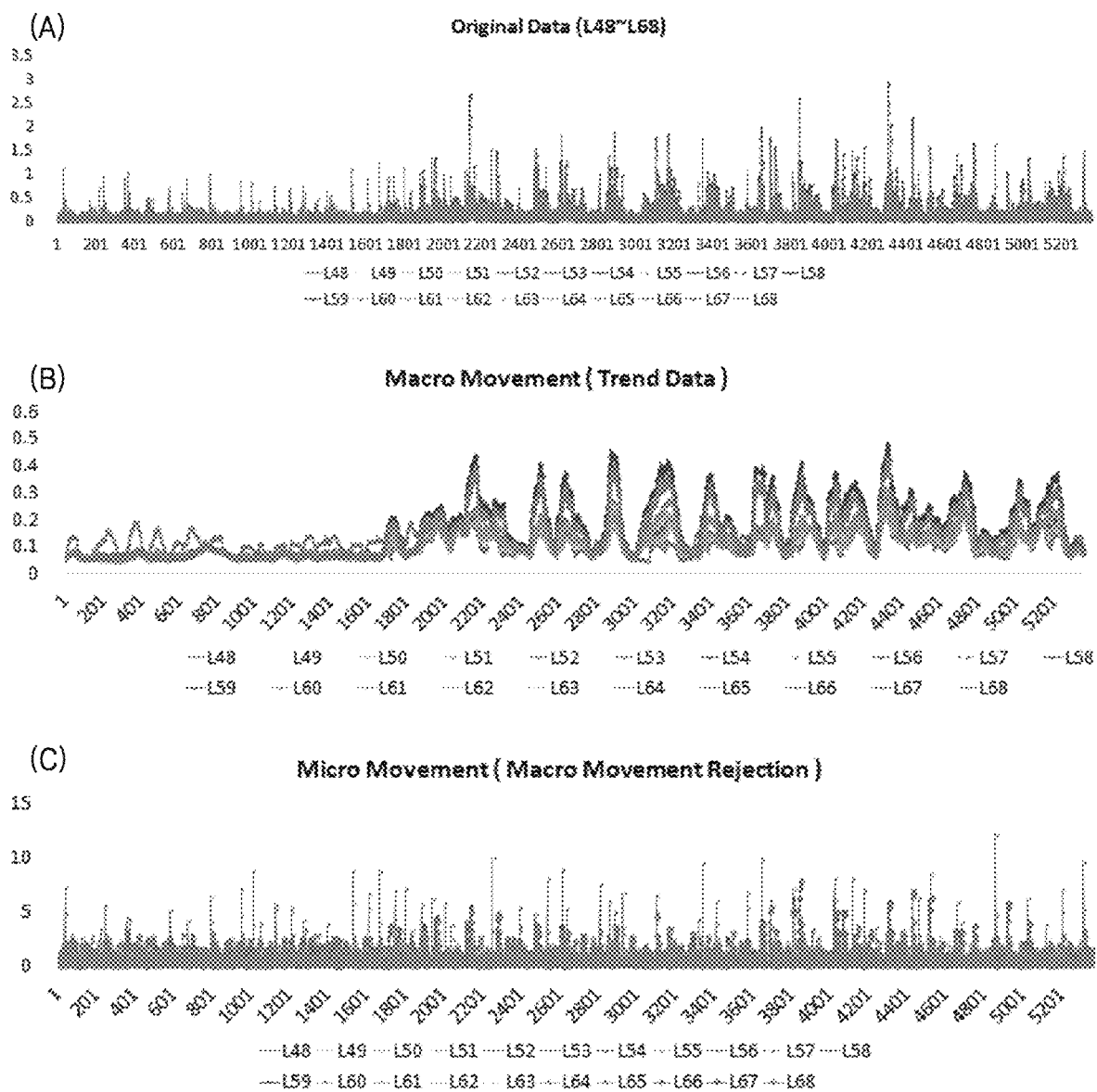
Figure 23:
Figure 24:
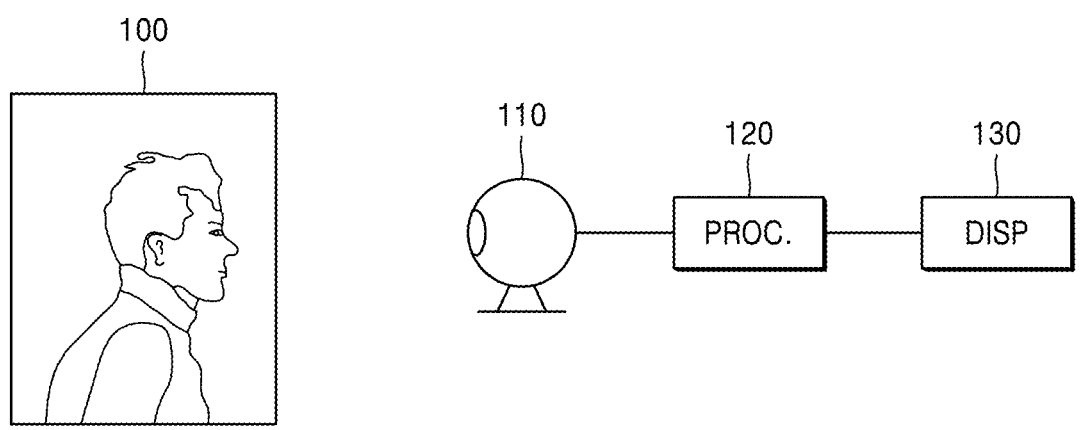

B-1 and B-2 in FIG. 2 illustrate a graph showing changes in the amount of micro movement according to the progress of frames (time flow), and facial expressions related thereto, respectively;

FIG. 3 is a view illustrating image processing using point masking for eye and facial muscles;

FIG. 4 is a view illustrating a change in movement data before and after use of facial masking, with macro movement removed;

FIG. 5 is trend analysis graphs using a regression trend and a moving average trend in the economic field;

FIG. 6 is a view illustrating changes in raw data and trend data of facial expression movement according to window size (0.1 s, 2 s, 0.5 s, and 10 s);

FIG. 7 is a graph illustrating raw data, detrend data, and micro movement according to the processing of a facial movement image;

FIG. 8 is a view of a distribution of landmarks defined on a face;

FIG. 9 is a flowchart of noise processing by macro movement through image processing, according to one or more embodiments;

FIG. 10 is a view illustrating an experimental procedure and an environment with respect to one or more embodiments;

FIG. 11 is a view illustrating the extraction of trend data for macro movement in image data processing for landmark number 34;

FIG. 12 is a view illustrating the extraction of trend data for macro movement in image data processing for landmark numbers 1 to 16;

FIG. 13 is a graph illustrating movement data in landmark numbers 17 to 26 corresponding to an eyebrow region;

FIG. 14 is a graph illustrating movement data in landmarks 27 to 35 corresponding to a nose region;

FIG. 15 is a graph illustrating movement data in landmark numbers 36 to 47 corresponding to a nose region;

FIG. 16 is a graph illustrating movement data in landmark numbers 48 to 68 corresponding to a mouth portion;

FIG. 17 is a graph illustrating a reference interval and movement data in landmark 34 corresponding to the end portion of a nose;

FIG. 18 is a graph illustrating movement data in landmark numbers 1 to 16 corresponding to a face contour;

FIG. 19 is a graph illustrating movement data in landmark numbers 17 to 26 corresponding to both eyebrows;

FIG. 20 is a graph illustrating movement data in landmark numbers 27 to 35 around a nose;

FIG. 21 is a graph illustrating movement data in landmark numbers 36 to 47 indicating eye movement;

FIG. 22 is a graph illustrating movement data in landmark numbers 48 to 68 indicating movement around mouth;

FIG. 23 is a view of an interface screen of a facial movement information extraction system applied in one or more embodiments; and FIG. 24 is a block diagram illustrating a schematic configuration of a facial movement information extraction system, according to one or more embodiments.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a method and system for inferring and detecting physiological signals according to the present inventive concept is described with reference to the accompanying drawings.

The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements. In the drawings, elements and regions are schematically illustrated. Accordingly, the concept of the invention is not limited by the relative sizes or distances shown in the attached drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an overly formal sense unless expressly so defined herein.

Hereinafter, a method and an apparatus for canceling noise in a facial image according to one or more preferred embodiments will be described.

In the embodiments described later below, movement information of the facial image includes movement information of a vertex or a landmark defined in a face.

In a standard model of the face, a plurality of vertices or landmarks corresponding to various specific portions of the face are properly arranged in a standard face shape with reference to a reference point of the face.

Figure 1:
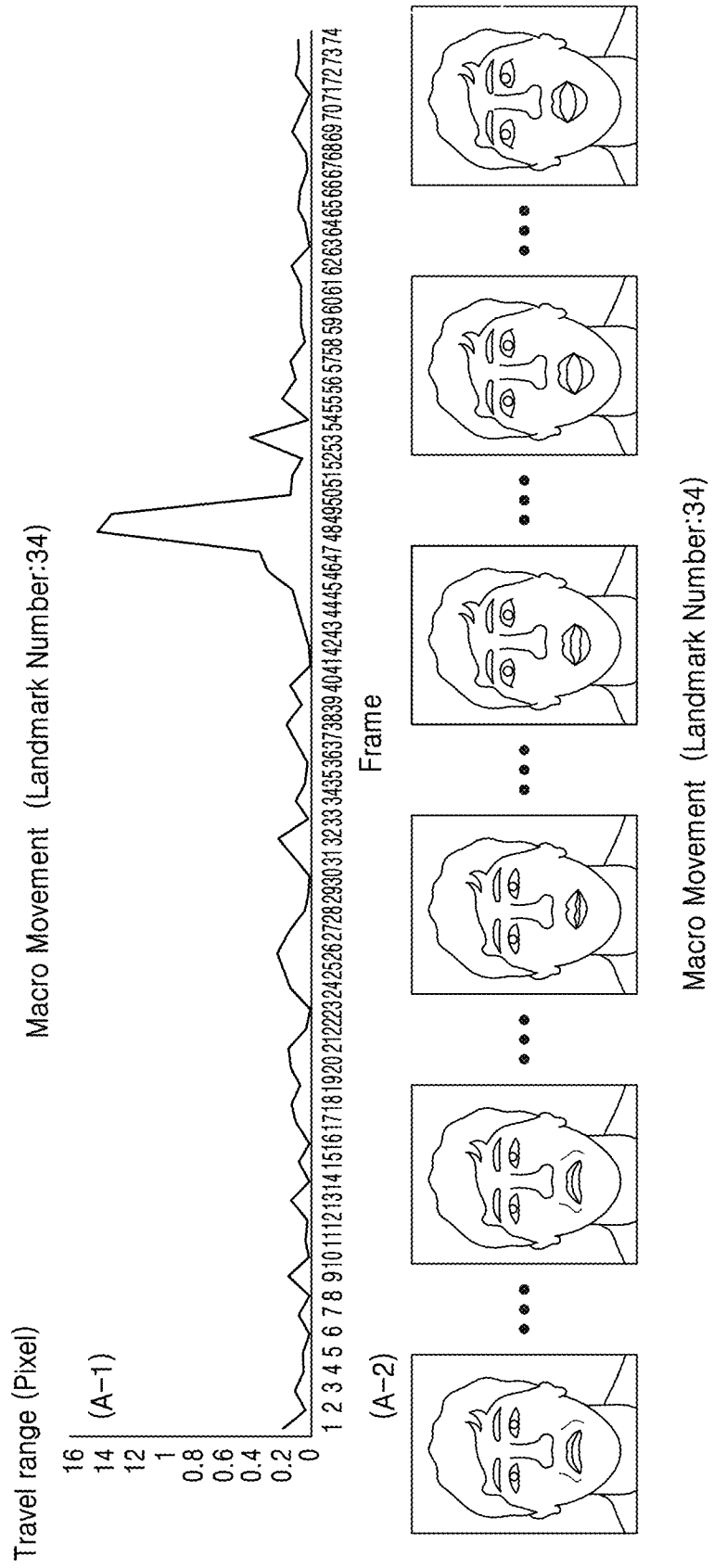

In the process of extracting facial movement, it is necessary to consider and define movement information that may be generated in the face after facial detection. As shown in FIGS. 1A and 1B, the facial movement may be classified into macro movement that represents relatively large movement and micro movement that represent relatively small movement.

Here, the macro movement means visually noticeable large movement (between 0.5 and 4 s), and the micro movement means inconspicuous short time movement (between 0.04 and 0.5 s).

Most of the movements in the face have no particular periodicity and correspond to irregular movements. In addition, noise data is generated due to a situation or a condition that occurs over time.

Proper noise processing is important for accurately analyzing subject-specific information using movement information (data). An embodiment defines noise movement that affects the extraction of micro movement and suggests a movement information extraction method considering factors shown in Table 1 below.

TABLE 1

The facial movement factors that need to be considered are listed

| Movement range | Defined and factors |
| --- | --- |
| Face outside | Outside movement of the face<br>Hand, gesture, head, walking, other background movements |
| Face inside | Inside movement of the face<br>Macro: Noticeable large movement (between 0.5 s-4 s)<br>Micro: Inconspicuous short time movement (between 0.04-0.5 s)<br>Macro: Eye blinking, facial expression, general conversation, etc.<br>Micro: Micro Expression, Real & Fake, etc. |
| Others | Technical point of view that occur when tracking facial movements errors<br>Motion due to ROI update in face tracking<br>Motion error due to codec decoding |

The first noise generated when extracting facial data is movement occurring outside the face. The movement occurring outside the face is related to facial detection. When a face is detected in image processing, a region of interest (ROI) is generally selected according to the size of the face, and only a facial image may be extracted. However, since a human face has a complicated outline that is difficult to define by the ROI, the facial image is extracted by selecting a portion of the background outside the face. Therefore, a background, head movement, etc., which may occur outside the face, may be included in the facial image and act as noise.

The second noise is movement that occurs within the face. Within the face, small micro movement and large macro movement coexist as described above. When movement data based on a frame difference is extracted under a moving window technique, it takes the form of B-1 in FIG. 1B.

In the corresponding graph, only characteristics of the macro movement may be separated by a method of extracting the micro movement, but it is difficult to accurately separate characteristics of the micro movement. In particular, when the amount of movement is calculated by the method of extracting the micro movement, the characteristics of the macro movement are large. Therefore, when actual macro movement occurs, data analysis of the micro movement is affected by components of the macro movement. If movement data components appearing on the face show specific periodicity, it is possible to separate them by frequency analysis, but it is difficult to separate expression movement because the expression movement is not periodic movement. In addition, there is subtle movement in the existing micro movement, which is also the same as the above-described noise in that there is no periodicity, and movement intensity is instantaneously stronger than micro movements. However, since the macro movement is larger, influence of the macro movement may not be avoided simply by the fact that the magnitude of movement is strong. Therefore, the macro movement may be estimated as noisy movement for the micro movement.

The third noise is an error that may occur in the image processing other than movement occurring inside and/or outside the face. The ROI is selected every time a face region is detected, and coordinates of each portion of the face of a subject may be obtained against a standard image or an original image. However, the position and the size of the ROI are not the same for every frame, and thus an ROI error, which is deformed when a face is detected from movement data based on a frame difference, is included in the movement data as noise.

Also, in case of a real-time image, an image compression codec is not used, but when a compressed image is utilized, a decoding process for restoring an image from a compressed codec is mostly performed. In the decoding process, although actual movement information does not occur according to a codec algorithm and a condition of the compressed image, an RGB value of each pixel changes in the decoding process. A change in an RGB value of a pixel may be seen as noise occurring in terms of a frame difference. In such a phenomenon, it is difficult to predict noise data, even if a compression algorithm is identical, because the degree of compression depending on the ambient brightness of an input image, the color of a subject recorded in the image, and an edge line may vary. Since the micro movement is very small and invisible, data needs to be extracted with sufficient consideration of such movement noise.

Previous studies conducted for recognition of micro facial expressions also use various methods to remove noisy movement. For example, as shown in FIG. 3, an image mask is applied to a macro movement region that occurs when a plurality of facial expressions are formed, and a method of recognizing a micro facial expression may be utilized after removing this portion. However, it is difficult to completely remove a noise component generated in the entire face by extracting data after removing a noise generating region from an original image input in this way.

In another research, as shown in FIG. 4, data is extracted except for an actual face region. However, since macro movement is still reflected, a methodology for eliminating the macro movement has been studied. Among various methods of canceling noise, noise analysis and processing in a frequency domain is not performed because movement generated in a facial expression does not have specific periodicity but is event type data in terms of time. Therefore, small movement extracted by canceling noise generated in terms of time may be regarded as accurate micro movement.

There is a statistical method of accumulating data that varies in real time and reflecting decisions based on data trends. This is classified into a regression analysis method and a moving average analysis method as shown in FIG. 5. The regression analysis method is similar to a method of creating a trend line by estimating the trend in a regression type by synthesizing the whole data. The moving average analysis method is a method of determining a certain analysis interval and averaging it and continuously sliding an analysis point in time continuously. When large event (temporary) data is generated, a trend is reflected at a corresponding point in time. In an embodiment, in order to reflect irregular real-time facial movements, a noise trend is detected using the moving average analysis method that may reflect a specific movement at each moment. In this embodiment, in order to determine interval data, that is, a trend, it is important to set interval data of a window size (time interval).

As illustrated in FIG. 6, it is difficult to reflect a data component of macro movement that occurs every moment when a window size in which the trend is to be determined is long, for example, about 10 seconds. On the contrary, when the window size is very short, for example, about 0.1 seconds, it is impossible to separate only a trend of the macro movement by mixing data of micro movement. Therefore, it is very important to select an appropriate window size range, which should be a suitable time for facial movement. According to previous research results, the time of macro movement when facial expressions are formed is about 0.5 to 4 seconds and the duration is about 0.75 to 2 seconds.

In an embodiment, a window size range is determined to be a median value of 2 seconds in consideration of a time that movement may occur and the duration.

An embodiment applies an electromyography (EMG) data analysis method when measuring muscle movement. In EMG data analysis, the first signal processing method is a rectifying process. The rectifying process refers to a process of converting alternating current (AC) signal data including negative values into DC signals having a positive value. Therefore, the amount of facial muscle movement also needs to be rectified. In EMG, two methods of moving average and mean square are used for the rectifying process. When signal processing as shown in FIG. 7 is performed and a macro movement component in movement data is detrended from raw data by the method of Equation 3 described later below, a negative case occurs as shown in (1) of FIG. 7. Original data contains characteristics of the movement but is negative data. However, muscle movements may not be negative because they are usually separated depending on whether they are active-inactive or small-large.

This phenomenon occurs because trend data of the macro movement obtained from the original data is greater than the original data. This means that a characteristic of the macro movement at the same point in time occupies more than 100%, and if it is interpreted in reverse, it can be seen that there is no characteristic of the macro movement in a corresponding section. Therefore, when a rectifying process as in an EMG method is performed for the corresponding section, a rectifying process capable of maintaining the characteristic is required because a movement characteristic is deformed as shown in (2) of FIG. 7.

When it is determined that there is only micro movement in a section where there is no characteristic of macro movement and when a pattern of detrended data is examined to determine whether or not micro movement is present and data is extracted, it is possible to extract data while maintaining a rectified characteristic and a micro movement characteristic as in a waveform indicated by (3) in FIG. 7.

A method of extracting a substantial micro movement through the definition and cancellation of movement noise in data extraction of the micro movement of facial muscles will be described in the embodiment described later below.

Facial tracking is very important for extracting accurate face data and corresponding region data before micro movement extraction. Various application programming interfaces (APIs) related to face tracking using image processing are proposed. However, in the embodiment described later below, OpenCV, which is an open source, and "OpenFace Tracker," which is based on a "Dlib" library, are used (OpenFace version 0.2.5). The reason for selecting Open-Face is that the DNN 3D model is used to perform facial tracking, so that more natural and robust tracking is possible, and as shown in FIG. 8, coordinates for each major region located on the face may be obtained through detection of a landmark defined for each vertex of the face.

FIG. 9 shows a procedure for extracting noise-removed micro movement according to an embodiment. An Open-Face Tracker is applied to an image input to eliminate the external movement (noise) of a face described above.

For the background or external movement of an ROI state where noise may occur, all movements that may occur outside the face are eliminated by tracking only coordinates that occur based on muscles in the face through landmark detection. In a facial image, a moving distance is measured from a total of 68 landmarks using coordinates by point. For example, when landmark number 10 is selected, a frame distance (Df) is calculated using the Euclidean distance formula using coordinate values in the front and rear frames of landmark 10.

$$D_f = \sqrt{(Ax_{i-1} - Ax_i)^2 + (Ay_{i-1} - Ay_i)^2} \quad \text{[Equation 1]}$$

Ax=x coordinate
Ay=y number
i=frame number

The unit of the frame difference (Df) may be matched with the number of pixels since the frame difference (Df) is a distance calculated based on, for example, the front and rear coordinates of landmark 10 provided by OpenFace. There are individual differences in face size, the ratio of measurement varies, and the ratio of unit matching needs to be considered. Therefore, a face area may be extracted for the analysis of movement data. When the face area is extracted, a rate error is minimized when the movement effect is low at each point.

As shown in FIG. 8, the least affected point is considered as the center of the face, and a triangle area is calculated based on both eyes and nose (landmark numbers 39, 42, and 29). Distances La, Lb, and Lc among three points such as P1, P2, and P3 are obtained to obtain the triangle area, and a triangle area Areai per frame (i) is obtained through Heron's formula using the distances La, Lb, and Lc.

$$Dp(P1,P2) = \sqrt{(P1x - P2x)^2 + P1y - P2y - P2y)^2}$$

$$La = Dp(P1,P2)$$

$$Lb = Dp(P2,P3)$$

$$Lc = Dp(P1,P3)$$

$$p = (La + Lb + Lc)/2$$

$$A_i = \sqrt{p(p-La)(p-Lb)(p-Lc)} \quad \text{[Equation 2]}$$

Dp=point distance
P1, P2, P3=Point 1, 2, 3
A=Area
i=frame number

Movement raw data extracted by the above mathematical method is used for extracting trend data related to macro movement. The trend data is extracted by a centered moving average method. The window size applied at this time is obtained when the window size of macro movement information is in the range of 1.5 to 2.5 seconds, and the trend data, which is the basis for determining whether or not macro movement exists most effectively, is extracted in 2 seconds.

Trend data (Dt) is used as detrend data (Ddt) for canceling noise components from sample data (Pm) by the macro movement, and Equation 3 represents the process mathematically.

$$Dt = \frac{Pm + Pm_{+1} + \ldots + Pm_{+n}}{size} \quad \text{[Equation 3]}$$

$$= \frac{1}{n} \sum_{i=size}^{n} Pm - i$$

$$idx = (size/2) + 1$$

$$Ddt = \left( \sum_{i=time}^{n} (Dr[idx]/Dt[idx]) - 1 \right)^{idx+time}$$

Pm = sample data (raw data = Frame distace)

size = window size × 30 fps idx = Centered Moving Average index time = Real Time Input As summarized in Equation 3 above, trend data (Dt), which is an average of a certain time interval, is calculated from sample data (Pm) as raw data (Pm) obtained from the frame difference described above. The trend data (Dt) is obtained by a centered moving average method for the raw data (Pm). Detrend data (Ddt) reflecting the ratio of raw data values to the trend data (Dt) is obtained in order to remove noise components due to macro movement from the raw data (Dr).

When a value of the detrend data (Ddt) is zero or less, that is, when a value of the raw data is less than a value of the trend data (Dt), it is determined that only pure micro movement data without noise due to macro movement is included. As a result, a value of the sample data (Pm) is applied as micro movement data for movement information extraction.

Meanwhile, when the ratio is greater than 0, it is determined that the sample data (Pm) includes noise due to macro movement, and the value of the detrend data is taken as micro movement data.

A value of the detrend data (Ddt) is a value that replaces raw data when the raw data is greater than a trend value. The following shows a raw data processing result up to the frame number (Idx=33 to 39) according to the above Equations.

TABLE 5

| Idx | Raw Data(Pm) | Trend Data(Dt) | Detrend((Dtr) | Micro movement |
|---|---|---|---|---|
| 33 | 0.141313 | 0.137383 | 0.028607 | 0.028607264 |
| 34 | 0.092983 | 0.138697 | −0.3296 | 0.092983 |
| 35 | 0.239857 | 0.136811 | 0.753199 | 0.753198619 |
| 36 | 0.119685 | 0.140193 | −0.14628 | 0.119685 |
| 37 | 0.091042 | 0.142934 | −0.36305 | 0.091042 |
| 38 | 0.175882 | 0.143906 | 0.222204 | 0.222203805 |
| 39 | 0.044134 | 0.146005 | −0.69772 | 0.044134 |

In the table above, "Micro movement" finally shows data with macro noise canceled. Output data actually used through "Detrend", that is, a noise cancellation process, has only a value for pure micro movement.

In the table above, "Micro movement" finally shows data with macro noise canceled. Output data actually used through "Detrend", that is, a noise cancellation process, has only a value for pure micro movement.

<Subjects>

Subjects are divided into group A, in which movements with strong expression are caused, and group B, in which natural movement is caused through by conversation. Twenty healthy adult men and women were recruited as subjects. Twenty (10 males and 10 females) were recruited for each of group A and group B. The recruited subjects do not have any pathological symptoms such as facial paralysis and did not receive any special education or training on facial expressions.

<Experimental Stimulation>

Group A, in which strong movements are caused in the face, uses stimulus based on Ekman's basic emotions. Ekman's six basic emotions are expressions that minimize effects of Eastern, Western, and cultural differences and may be created by anyone without special education or practice, so the stimulus is selected. In addition, a strong facial expression causes noise movement data. In group B, natural movement has to be induced in the face, and thus group B was allowed to listen to music and speak freely in order to induce natural conversation.

<Environment and Procedure>

Task performance of group A is executed by expressing Ekman's six basic expressions for about 30 seconds. Task performance of group B is divided into an initial reference section (60 s) and a natural section (120 s). Image data is captured at a resolution of 640×480 at 30 fps per second using LifeCam HD-5000 manufactured by Microsoft Corporation. In order to minimize the influence of the change of an image environment, automatic adjustment functions such as white balancing and auto focus which are automatically controlled by an web camera are turned off to perform image capturing for an upper body. The captured image is recorded using an MPEG-4 codec basically supported by the web camera. The upper body and the background are captured in a fixed state, and the procedure is as shown in FIG. 10.

<Verification Method>

In facial micro movement extraction, two verification methods are performed to confirm that noise is canceled properly.

The first method confirms the accuracy of tracking macro movement. In order to verify the trend of macro movement, a prediction model analysis method is used among statistical analysis methods. "Forecast" is a method of verifying the prediction accuracy of a trend model over time by analyzing time series data. Therefore, it can be a good method to identify a prediction model that tracks the trend of macro movement with a window size of 2 seconds. Accuracy of the predictive model is verified by three methods such as mean absolute mean absolute error percent error (MAPE), mean absolute error (MAE), and mean standard deviation (MSD) expressed in Equation 5.

$$MAPE = \frac{1}{n}\sum_{i=1}^{n}\left|\frac{y_t - \hat{y}_t}{y_t}\right| \times 100$$ [Equation 4]

$$MAE = \frac{1}{n}\sum_{i=1}^{n}|y_t - \hat{y}_t|$$

$$MSD = \frac{1}{n}\sum_{i=1}^{n}(y_t - \hat{y}_t)^2$$

In the second MAE method, single data is arbitrarily generated by combining an image with no facial expression and an image with facial expression. After applying a noise cancellation algorithm based on the generated data, it is confirmed that data related to facial movement is correctly removed by comparing with a dominant peak frequency of the image with no facial expression.

<Result>

FIG. 11 is a signal graph of the entire section that forms a facial expression according to a facial stimulus, and is the data of nose tip (landmark 34) with the least movement in the face. In FIG. 11, (A) is a graph of raw data obtained by extracting a travel range in pixel of a landmark on a time axis in an X direction and (B) is a graph showing macro movement, that is, trend data on facial movement, from the raw data. (C) shows micro movement from the raw data by removing components of macro movement through DCMA.

In (A) of FIG. 11, it is confirmed that, when a facial expression task is performed, macro movement and micro movement are observed together when instant expression is made, and there is no significant change while maintaining the expression. In (A) of FIG. 11, it is confirmed that only macro movement data according to facial expression excluding micro movement is extracted as data in which only trend data of macro movement indicated by expression is accumulated on graph (A). In (C) of FIG. 11, it is confirmed that trended data of macro movement is detrended from raw data to extract only pure micro movement in which macro movement data is removed.

A landmark defined by OpenFace may group points that show an identical movement pattern according to an area. The grouped areas are divided into a contour of a face, eyebrows, a nose, eyes, and a mouth. While performing the task, movement of the contour of a face corresponds to landmark numbers 1 to 16. (A) in FIG. 12 is a graph of movement data without noise canceled from the contour of a face, and (B) in FIG. 12 is a graph of only trend data of macro movement. (C) in FIG. 12 is a graph showing only detrended micro movement.

FIG. 13 is a graph showing movement of eyebrows corresponding to landmark numbers 17 to 26. In FIG. 13, (A) is a graph in which no eyebrows are removed, (B) shows trend data of macro movement, and (C) shows a graph of micro movement obtained using the trend data of macro movement of (B).

FIG. 14 is a graph showing movement of a nose corresponding to landmark numbers 27 to 35. In FIG. 14, (A) is a data graph in which noise of the nose is not canceled, (B) is a data graph showing only trend data of macro movement, and (C) is a data graph of micro movement obtained by using the trend data of (B).

FIG. 15 is a graph showing movement of eyes corresponding to landmark numbers 36 to 47. In FIG. 15, (A) is a data graph in which noise of the nose is not canceled, (B) is a data graph showing only trend data of macro movement, and (C) is a data graph of micro movement obtained by using the trend data of (B).

FIG. 16 is a graph showing movement of a mouth corresponding to landmark numbers 48 to 68. In FIG. 16, (A) is a data graph in which noise of the nose is not canceled, (B) is a data graph showing only trend data of macro movement, and (C) is a data graph of micro movement obtained by using the trend data of (B).

FIG. 17 is a graph showing movement of a nose tip (landmark 34) in a section where natural conversation is performed with a reference. In FIG. 17, (A) shows raw data, (B) is a data graph showing only trend data of macro movement, and (C) is a data graph of micro movement obtained by using the trend data.

FIG. 17 shows, in the graph of raw data, that there is no macro movement at a reference section and macro movement occurs after a neutral task is performed. (B) in FIG. 17 shows that a difference in the trend of macro movement is more apparent. (C) in FIG. 17 shows that an identical level of micro movement is output in both the reference section and the task section when noise is canceled by using the trend data of the macro movement.

As in the previous experiment, analysis is done by grouping by face area. As shown in FIG. 18, landmark numbers 1 to 16 are responsible for a contour of a face.

In FIG. 18, (A) is a graph in which noise appearing on the contour of the face is not canceled, and (B) is a graph in which only trend data of macro movement is extracted. (C) in FIG. 18 is a graph showing only macro movement without noise after detrending.

FIG. 19 is a graph showing movement of both eyebrows corresponding to landmark numbers 17 to 26. There is no big difference in macro movement or micro movement of the eyebrows. In the previous experiment, a strong facial expression is made, and the eyebrows show a clear difference in movement. However, in natural conversation, it can be seen that the eyebrows are not strongly expressed. Although the degree of representation is weak, macro movement is still included and only micro movement data is extracted through the process of (A), (B), and (C).

FIG. 20 is a graph showing movement around the nose corresponding to landmark numbers 27 to 35. The movement around the nose does not have strong macro movement, but still include noise of macro movement. In FIG. 20, (A) shows raw data, (B) is a data graph showing only trend data of macro movement, and (C) is a data graph of micro movement obtained by using the trend data.

FIG. 21 is a graph showing movement of eyes corresponding to landmark numbers 36 to 47.

In FIG. 21, (A) shows raw data, (B) is a data graph showing only trend data of macro movement, and (C) is a data graph of micro movement obtained by using the trend data. The movement of eyes also does not have strong macro movement, but still includes noise of macro movement.

FIG. 22 is a graph showing movement around a mouth corresponding to landmark numbers 48 to 68.

In FIG. 22, (A) shows raw data, (B) is a data graph showing only trend data of macro movement, and (C) is a data graph of micro movement obtained by using the trend data. This also has characteristics similar to movement data of the nose.

<Verification of Extraction>

As a trend analysis, a trend analysis on a macro movement state is performed. As a result, accuracy of tracking macro movement in an experiment with strong facial expressions is generally high. As a result of comparison of average error rates between the entire subject and all points of the face, MAE is 0.098004, MSD is 0.044294, and MAPE is 1.880564, and Table 2 shows the results (Participants 20, N=5400).

TABLE 2

| Landmark number | MAE | | MSD | | MAPE | |
|---|---|---|---|---|---|---|
| | M | SD | M | SD | M | SD |
| L01 | 0.103653 | 0.048870 | 0.035501 | 0.031892 | 1.460848 | 0.534047 |
| L02 | 0.096987 | 0.050118 | 0.036643 | 0.037365 | 1.512065 | 0.511381 |
| L03 | 0.099174 | 0.063235 | 0.047953 | 0.061452 | 1.421617 | 0.430591 |
| L04 | 0.108167 | 0.081868 | 0.066014 | 0.096027 | 1.438193 | 0.447874 |
| L05 | 0.110281 | 0.092759 | 0.075894 | 0.117930 | 1.335902 | 0.328652 |
| L06 | 0.113118 | 0.100308 | 0.084406 | 0.133752 | 1.345290 | 0.344474 |
| L07 | 0.114295 | 0.101764 | 0.085908 | 0.133495 | 1.332317 | 0.379759 |
| L08 | 0.114670 | 0.099350 | 0.080562 | 0.123912 | 1.366411 | 0.346933 |
| L09 | 0.118171 | 0.106695 | 0.086084 | 0.139630 | 1.386980 | 0.371553 |
| L10 | 0.120234 | 0.117212 | 0.095998 | 0.172598 | 1.355059 | 0.336284 |
| L11 | 0.119956 | 0.123258 | 0.101118 | 0.196576 | 1.298703 | 0.353427 |
| L12 | 0.115550 | 0.113922 | 0.090497 | 0.175508 | 1.299101 | 0.298477 |
| L13 | 0.107360 | 0.094100 | 0.070654 | 0.128963 | 1.338484 | 0.335085 |
| L14 | 0.098266 | 0.073131 | 0.053345 | 0.090022 | 1.377946 | 0.334425 |
| L15 | 0.090464 | 0.058032 | 0.039339 | 0.062542 | 1.416893 | 0.317579 |
| L16 | 0.088801 | 0.052030 | 0.031617 | 0.048702 | 1.410318 | 0.346369 |
| L17 | 0.098438 | 0.053824 | 0.033639 | 0.047446 | 1.348569 | 0.365285 |
| L18 | 0.129466 | 0.064028 | 0.060836 | 0.062583 | 1.856553 | 0.649901 |
| L19 | 0.112381 | 0.051097 | 0.045953 | 0.047352 | 1.841055 | 0.511617 |
| L20 | 0.096839 | 0.040582 | 0.037595 | 0.043352 | 1.680671 | 0.386707 |
| L21 | 0.090781 | 0.035486 | 0.034914 | 0.043108 | 1.617123 | 0.366714 |

TABLE 2-continued

| Landmark number | MAE | | MSD | | MAPE | |
|---|---|---|---|---|---|---|
| | M | SD | M | SD | M | SD |
| L22 | 0.087442 | 0.032094 | 0.030543 | 0.036422 | 1.521155 | 0.310264 |
| L23 | 0.093623 | 0.039389 | 0.035023 | 0.044076 | 1.593073 | 0.462990 |
| L24 | 0.096537 | 0.037898 | 0.038487 | 0.045688 | 1.642755 | 0.306659 |
| L25 | 0.100705 | 0.039526 | 0.039576 | 0.042349 | 1.729402 | 0.333832 |
| L26 | 0.111979 | 0.051078 | 0.045434 | 0.046738 | 1.813765 | 0.401974 |
| L27 | 0.123208 | 0.067858 | 0.056184 | 0.065686 | 1.749023 | 0.531835 |
| L28 | 0.099514 | 0.031076 | 0.031722 | 0.016877 | 2.144312 | 0.637645 |
| L29 | 0.079810 | 0.018522 | 0.017399 | 0.008407 | 1.938412 | 0.505643 |
| L30 | 0.070178 | 0.015341 | 0.012891 | 0.007341 | 1.724322 | 0.350304 |
| L31 | 0.077687 | 0.019796 | 0.016399 | 0.010564 | 1.649444 | 0.369505 |
| L32 | 0.065418 | 0.019312 | 0.011484 | 0.008136 | 1.756334 | 0.272696 |
| L33 | 0.064113 | 0.019406 | 0.011578 | 0.008514 | 1.779072 | 0.241130 |
| L34 | 0.063992 | 0.018269 | 0.011613 | 0.008076 | 1.796481 | 0.285189 |
| L35 | 0.063066 | 0.015721 | 0.010712 | 0.006748 | 1.792591 | 0.267017 |
| L36 | 0.064992 | 0.014895 | 0.010849 | 0.006251 | 1.748920 | 0.256243 |
| L37 | 0.132112 | 0.059933 | 0.064132 | 0.042143 | 2.727212 | 0.839828 |
| L38 | 0.152154 | 0.076056 | 0.089427 | 0.062830 | 3.175591 | 1.032338 |
| L39 | 0.144756 | 0.069157 | 0.079894 | 0.053771 | 3.251111 | 1.077739 |
| L40 | 0.117793 | 0.045674 | 0.048653 | 0.028447 | 2.718908 | 0.811101 |
| L41 | 0.120892 | 0.049653 | 0.052049 | 0.032582 | 2.797449 | 0.842172 |
| L42 | 0.128404 | 0.056237 | 0.058991 | 0.038117 | 2.764797 | 0.855856 |
| L43 | 0.119854 | 0.040579 | 0.051488 | 0.027507 | 2.733268 | 0.797741 |
| L44 | 0.148563 | 0.064528 | 0.084670 | 0.052858 | 3.258329 | 1.090737 |
| L45 | 0.155519 | 0.067240 | 0.093556 | 0.058047 | 3.214841 | 0.989817 |
| L46 | 0.137214 | 0.051234 | 0.069459 | 0.040505 | 2.873190 | 0.796695 |
| L47 | 0.132305 | 0.046690 | 0.063753 | 0.035971 | 2.809982 | 0.727146 |
| L48 | 0.126591 | 0.044206 | 0.058512 | 0.032661 | 2.855433 | 0.795923 |
| L49 | 0.073810 | 0.027110 | 0.015626 | 0.013289 | 1.650717 | 0.174757 |
| L50 | 0.068132 | 0.022467 | 0.014316 | 0.011159 | 1.768734 | 0.183734 |
| L51 | 0.068412 | 0.022300 | 0.015223 | 0.012673 | 1.861660 | 0.199583 |
| L52 | 0.067973 | 0.020497 | 0.014934 | 0.012049 | 1.895261 | 0.247129 |
| L53 | 0.067912 | 0.018098 | 0.014473 | 0.011355 | 1.822986 | 0.240049 |
| L54 | 0.069232 | 0.018619 | 0.014099 | 0.010092 | 1.815985 | 0.268038 |
| L55 | 0.075171 | 0.022051 | 0.015195 | 0.010182 | 1.656971 | 0.178932 |
| L56 | 0.082103 | 0.026531 | 0.030691 | 0.032476 | 1.760462 | 0.177323 |
| L57 | 0.089474 | 0.032345 | 0.047084 | 0.057643 | 1.771215 | 0.221309 |
| L58 | 0.090446 | 0.034332 | 0.049470 | 0.060559 | 1.811009 | 0.183796 |
| L59 | 0.090846 | 0.035297 | 0.047977 | 0.057149 | 1.827719 | 0.306691 |
| L60 | 0.082915 | 0.030993 | 0.030868 | 0.031213 | 1.748749 | 0.174260 |
| L61 | 0.071376 | 0.024211 | 0.014503 | 0.011407 | 1.719483 | 0.230446 |
| L62 | 0.069946 | 0.025184 | 0.015543 | 0.012824 | 1.886893 | 0.278090 |
| L63 | 0.068844 | 0.022811 | 0.014992 | 0.011664 | 1.862618 | 0.219102 |
| L64 | 0.069571 | 0.021073 | 0.014601 | 0.010594 | 1.803048 | 0.237945 |
| L65 | 0.072789 | 0.019865 | 0.014511 | 0.009358 | 1.675706 | 0.166306 |
| L66 | 0.086325 | 0.032393 | 0.045585 | 0.057410 | 1.818267 | 0.171594 |
| L67 | 0.086311 | 0.033936 | 0.047283 | 0.059577 | 1.889644 | 0.202478 |
| L68 | 0.087187 | 0.035500 | 0.046071 | 0.056660 | 1.831926 | 0.172786 |
| Mean | 0.098004 | 0.047921 | 0.044294 | 0.050160 | 1.880564 | 0.422375 |

* M: Participants mean,
SD: Participants standard deviation
Trend verification of macro-movement (Participants 20, N = 5400

Results of the analysis of neutral movement will be explained below.

Accuracy of tracking macro movement in an experiment with natural movement is generally high. As a result of comparison of average error rates between the entire subject and all points of the face, MAE shows an error of 0.098004, MSD shows an error of 0.044294, and MAPE shows an error of 1.880564, which are shown in Table 3.

TABLE 3

| Landmark number | MAE | | MSD | | MAPE | |
|---|---|---|---|---|---|---|
| | M | SD | M | SD | M | SD |
| L01 | 0.086129 | 0.038273 | 0.038404 | 0.076714 | 1.176309 | 0.237343 |
| L02 | 0.076571 | 0.032249 | 0.032653 | 0.073319 | 1.161412 | 0.232045 |
| L03 | 0.072063 | 0.028402 | 0.030638 | 0.074145 | 1.130922 | 0.197715 |
| L04 | 0.075018 | 0.028523 | 0.032709 | 0.077171 | 1.10979 | 0.173429 |
| L05 | 0.075556 | 0.030767 | 0.034412 | 0.081460 | 1.086948 | 0.161911 |
| L06 | 0.076392 | 0.036456 | 0.037466 | 0.088161 | 1.063047 | 0.162083 |
| L07 | 0.078072 | 0.041539 | 0.041854 | 0.098273 | 1.039822 | 0.15044 |
| L08 | 0.081167 | 0.040328 | 0.043094 | 0.098445 | 1.049048 | 0.133852 |
| L09 | 0.084183 | 0.037618 | 0.042396 | 0.094143 | 1.059063 | 0.122078 |
| L10 | 0.082464 | 0.033707 | 0.039590 | 0.091384 | 1.050763 | 0.111371 |

TABLE 3-continued

| Landmark number | MAE M | MAE SD | MSD M | MSD SD | MAPE M | MAPE SD |
|---|---|---|---|---|---|---|
| L11 | 0.077743 | 0.029752 | 0.036281 | 0.089905 | 1.023053 | 0.102856 |
| L12 | 0.073526 | 0.026800 | 0.033105 | 0.087452 | 1.014807 | 0.098703 |
| L13 | 0.071371 | 0.024108 | 0.030322 | 0.082454 | 1.045979 | 0.100289 |
| L14 | 0.069590 | 0.021412 | 0.027732 | 0.075894 | 1.079227 | 0.110991 |
| L15 | 0.068816 | 0.021475 | 0.026148 | 0.069296 | 1.124563 | 0.146028 |
| L16 | 0.072607 | 0.025522 | 0.027003 | 0.063978 | 1.149748 | 0.171621 |
| L17 | 0.079847 | 0.030870 | 0.029499 | 0.060380 | 1.143665 | 0.188045 |
| L18 | 0.117864 | 0.052124 | 0.059412 | 0.079708 | 1.462143 | 0.344381 |
| L19 | 0.089502 | 0.040111 | 0.037439 | 0.070234 | 1.288016 | 0.274329 |
| L20 | 0.066383 | 0.025392 | 0.024119 | 0.065110 | 1.102335 | 0.164089 |
| L21 | 0.058967 | 0.016826 | 0.020376 | 0.063316 | 1.051822 | 0.085151 |
| L22 | 0.058811 | 0.015296 | 0.019991 | 0.062485 | 1.032696 | 0.072046 |
| L23 | 0.062680 | 0.015770 | 0.020674 | 0.061935 | 1.066213 | 0.132184 |
| L24 | 0.065872 | 0.019671 | 0.022273 | 0.062314 | 1.108374 | 0.134271 |
| L25 | 0.073575 | 0.027917 | 0.026696 | 0.063934 | 1.178594 | 0.207789 |
| L26 | 0.091325 | 0.039538 | 0.037445 | 0.069020 | 1.299589 | 0.279343 |
| L27 | 0.109850 | 0.048104 | 0.050877 | 0.076477 | 1.38036 | 0.31887 |
| L28 | 0.097329 | 0.036881 | 0.041298 | 0.064905 | 1.535794 | 0.316005 |
| L29 | 0.071818 | 0.023895 | 0.025844 | 0.062354 | 1.248749 | 0.178228 |
| L30 | 0.056457 | 0.018589 | 0.020465 | 0.064347 | 1.035954 | 0.09775 |
| L31 | 0.061803 | 0.022305 | 0.023171 | 0.068059 | 1.031764 | 0.106724 |
| L32 | 0.056300 | 0.017668 | 0.020319 | 0.062420 | 1.094244 | 0.094323 |
| L33 | 0.052512 | 0.015825 | 0.019517 | 0.063690 | 1.053941 | 0.092197 |
| L34 | 0.051873 | 0.015907 | 0.019669 | 0.064819 | 1.032602 | 0.096729 |
| L35 | 0.052304 | 0.016510 | 0.019416 | 0.063656 | 1.048462 | 0.093945 |
| L36 | 0.056530 | 0.019064 | 0.020371 | 0.063128 | 1.087544 | 0.110981 |
| L37 | 0.148338 | 0.062768 | 0.090332 | 0.091464 | 2.087801 | 0.597224 |
| L38 | 0.162129 | 0.069084 | 0.105750 | 0.099928 | 2.272745 | 0.655826 |
| L39 | 0.152725 | 0.065412 | 0.094359 | 0.092879 | 2.256094 | 0.655266 |
| L40 | 0.124247 | 0.053575 | 0.065388 | 0.077568 | 1.955241 | 0.532028 |
| L41 | 0.132204 | 0.056850 | 0.073104 | 0.081912 | 2.012403 | 0.548451 |
| L42 | 0.141680 | 0.059861 | 0.082812 | 0.086757 | 2.059795 | 0.570951 |
| L43 | 0.125179 | 0.052413 | 0.066193 | 0.077007 | 1.989215 | 0.542998 |
| L44 | 0.154415 | 0.065168 | 0.095737 | 0.091902 | 2.258199 | 0.662521 |
| L45 | 0.161176 | 0.066951 | 0.103452 | 0.095643 | 2.267534 | 0.687849 |
| L46 | 0.148959 | 0.060633 | 0.089617 | 0.087633 | 2.069755 | 0.598188 |
| L47 | 0.141244 | 0.057033 | 0.081143 | 0.082838 | 2.041948 | 0.56641 |
| L48 | 0.135619 | 0.056425 | 0.076113 | 0.081777 | 2.041457 | 0.569489 |
| L49 | 0.085204 | 0.037471 | 0.035342 | 0.085604 | 1.173972 | 0.117261 |
| L50 | 0.073787 | 0.026924 | 0.028675 | 0.068697 | 1.164878 | 0.109571 |
| L51 | 0.065559 | 0.021440 | 0.024678 | 0.064130 | 1.124317 | 0.090594 |
| L52 | 0.063118 | 0.020719 | 0.023764 | 0.063704 | 1.110742 | 0.105176 |
| L53 | 0.066330 | 0.022488 | 0.024703 | 0.064359 | 1.119221 | 0.103443 |
| L54 | 0.073632 | 0.028157 | 0.027661 | 0.068397 | 1.15993 | 0.12683 |
| L55 | 0.085910 | 0.039997 | 0.035218 | 0.087705 | 1.15993 | 0.120157 |
| L56 | 0.097796 | 0.038450 | 0.043820 | 0.088362 | 1.227031 | 0.11843 |
| L57 | 0.106198 | 0.041644 | 0.053517 | 0.095032 | 1.249586 | 0.140207 |
| L58 | 0.105042 | 0.040850 | 0.053671 | 0.094880 | 1.255277 | 0.134309 |
| L59 | 0.105310 | 0.040254 | 0.053175 | 0.095156 | 1.238194 | 0.132221 |
| L60 | 0.096451 | 0.035788 | 0.043564 | 0.087048 | 1.218355 | 0.115911 |
| L61 | 0.082589 | 0.034902 | 0.033737 | 0.082177 | 1.174727 | 0.113073 |
| L62 | 0.065988 | 0.021630 | 0.024676 | 0.063069 | 1.120626 | 0.085519 |
| L63 | 0.062980 | 0.020687 | 0.023597 | 0.062654 | 1.114406 | 0.09101 |
| L64 | 0.066763 | 0.022691 | 0.024777 | 0.063555 | 1.132786 | 0.097863 |
| L65 | 0.083418 | 0.038181 | 0.033914 | 0.085384 | 1.166154 | 0.119994 |
| L66 | 0.095151 | 0.037529 | 0.044721 | 0.085024 | 1.233321 | 0.127921 |
| L67 | 0.092939 | 0.036532 | 0.044364 | 0.085060 | 1.238464 | 0.133896 |
| L68 | 0.093400 | 0.036178 | 0.043944 | 0.085423 | 1.224615 | 0.115766 |
| Mean | 0.088946 | 0.035057 | 0.042032 | 0.077312 | 1.317148 | 0.224801 |

\* M: Participants mean,
SD: Participants standard deviation
Trend verification of natural-movement (Participants 50, N = 14400)

Frequency analysis results will be explained below. A noise cancellation algorithm (detrend) compares raw data of the image without facial expression with data extracted after applying the algorithm. As a result, it is confirmed that a dominant peak frequency is generally in the form of a harmonic frequency at each point of the face, and an average error of all points of the face is 0.242647 as a result of restoring the value to ½, which are shown in Table 4.

TABLE 4

| Landmark number | Dominant peak frequency Non-expression | Dominant peak frequency Detrend | Dominant peak frequency ½ Harmonic | Error |
|---|---|---|---|---|
| L01 | 0.571429 | 0.571429 | 1.142857 | 0.571429 |
| L02 | 1.750000 | 0.821429 | 1.642857 | 0.107143 |
| L03 | 1.750000 | 0.821429 | 1.642857 | 0.107143 |

TABLE 4-continued

| | Dominant peak frequency | | | |
|---|---|---|---|---|
| Landmark number | Non-expression | Detrend | ½ Harmonic | Error |
| L04 | 1.535714 | 0.821429 | 1.642857 | 0.107143 |
| L05 | 1.535714 | 0.821429 | 1.642857 | 0.107143 |
| L06 | 1.107143 | 0.821429 | 1.642857 | 0.535714 |
| L07 | 0.607143 | 0.821429 | 1.642857 | 1.035714 |
| L08 | 0.607143 | 0.821429 | 1.642857 | 1.035714 |
| L09 | 1.785714 | 0.821429 | 1.642857 | 0.142857 |
| L10 | 1.892857 | 0.821429 | 1.642857 | 0.250000 |
| L11 | 1.892857 | 0.821429 | 1.642857 | 0.250000 |
| L12 | 1.678571 | 0.821429 | 1.642857 | 0.035714 |
| L13 | 1.678571 | 0.821429 | 1.642857 | 0.035714 |
| L14 | 1.678571 | 0.821429 | 1.642857 | 0.035714 |
| L15 | 1.678571 | 0.821429 | 1.642857 | 0.035714 |
| L16 | 1.678571 | 0.821429 | 1.642857 | 0.035714 |
| L17 | 1.678571 | 0.821429 | 1.642857 | 0.035714 |
| L18 | 0.678571 | 1.571429 | 3.142857 | 2.464286 |
| L19 | 1.750000 | 0.821429 | 1.642857 | 0.107143 |
| L20 | 1.535714 | 0.821429 | 1.642857 | 0.107143 |
| L21 | 1.535714 | 0.821429 | 1.642857 | 0.107143 |
| L22 | 1.535714 | 0.821429 | 1.642857 | 0.107143 |
| L23 | 1.535714 | 0.821429 | 1.642857 | 0.107143 |
| L24 | 1.642857 | 0.821429 | 1.642857 | 0.000000 |
| L25 | 1.642857 | 0.821429 | 1.642857 | 0.000000 |
| L26 | 1.535714 | 0.821429 | 1.642857 | 0.107143 |
| L27 | 1.535714 | 0.821429 | 1.642857 | 0.107143 |
| L28 | 1.642857 | 0.821429 | 1.642857 | 0.000000 |
| L29 | 1.285714 | 0.821429 | 1.642857 | 0.357143 |
| L30 | 1.285714 | 0.821429 | 1.642857 | 0.357143 |
| L31 | 1.285714 | 0.821429 | 1.642857 | 0.357143 |
| L32 | 1.285714 | 0.821429 | 1.642857 | 0.357143 |
| L33 | 1.750000 | 0.821429 | 1.642857 | 0.107143 |
| L34 | 2.035714 | 0.821429 | 1.642857 | 0.392857 |
| L35 | 1.928571 | 0.821429 | 1.642857 | 0.285714 |
| L36 | 1.928571 | 0.821429 | 1.642857 | 0.285714 |
| L37 | 1.928571 | 0.821429 | 1.642857 | 0.285714 |
| L38 | 1.750000 | 0.821429 | 1.642857 | 0.107143 |
| L39 | 1.750000 | 0.821429 | 1.642857 | 0.107143 |
| L40 | 1.750000 | 0.821429 | 1.642857 | 0.107143 |
| L41 | 1.750000 | 0.821429 | 1.642857 | 0.107143 |
| L42 | 1.750000 | 0.821429 | 1.642857 | 0.107143 |
| L43 | 1.750000 | 0.821429 | 1.642857 | 0.107143 |
| L44 | 1.750000 | 0.821429 | 1.642857 | 0.107143 |
| L45 | 1.642857 | 0.821429 | 1.642857 | 0.000000 |
| L46 | 1.642857 | 0.821429 | 1.642857 | 0.000000 |
| L47 | 1.642857 | 0.821429 | 1.642857 | 0.000000 |
| L48 | 1.642857 | 0.821429 | 1.642857 | 0.000000 |
| L49 | 1.642857 | 0.821429 | 1.642857 | 0.000000 |
| L50 | 1.500000 | 0.821429 | 1.642857 | 0.142857 |
| L51 | 1.928571 | 0.821429 | 1.642857 | 0.285714 |
| L52 | 1.928571 | 0.821429 | 1.642857 | 0.285714 |
| L53 | 1.928571 | 0.821429 | 1.642857 | 0.285714 |
| L54 | 1.928571 | 0.821429 | 1.642857 | 0.285714 |
| L55 | 1.928571 | 0.821429 | 1.642857 | 0.285714 |
| L56 | 1.928571 | 0.821429 | 1.642857 | 0.285714 |
| L57 | 1.928571 | 0.821429 | 1.642857 | 0.285714 |
| L58 | 1.928571 | 0.821429 | 1.642857 | 0.285714 |
| L59 | 1.928571 | 0.821429 | 1.642857 | 0.285714 |
| L60 | 1.928571 | 0.821429 | 1.642857 | 0.285714 |
| L61 | 1.928571 | 0.821429 | 1.642857 | 0.285714 |
| L62 | 1.928571 | 0.821429 | 1.642857 | 0.285714 |
| L63 | 1.928571 | 0.821429 | 1.642857 | 0.285714 |
| L64 | 1.928571 | 0.821429 | 1.642857 | 0.285714 |
| L65 | 1.928571 | 0.821429 | 1.642857 | 0.285714 |
| L66 | 1.928571 | 0.821429 | 1.642857 | 0.285714 |
| L67 | 1.928571 | 0.821429 | 1.642857 | 0.285714 |
| L68 | 1.928571 | 0.821429 | 1.642857 | 0.285714 |
| Mean | 1.662815 | 0.828782 | 1.657563 | 0.242647 |

<System Configuration>

A noise cancellation apparatus according to an embodiment may be applied to a facial movement information detecting apparatus. The facial movement information detecting apparatus is implemented on a computer, and a moving picture camera, a monitor, and a keyboard are provided as additional apparatuses.

The facial movement information detecting apparatus real-time tracks a real face based on a movement data detection method according to the above-described method, and extracts movement data of each point in the face. This extraction process involves a noise cancellation process as described above.

This system is implemented using Visual Studio 2015 C++, OpenCV 3.1.0, and OpenFace 0.2.5 version. A main interface screen 1 of an implemented facial movement detection system is a main screen in which a face is actually tracked, and information about face tracking and landmark detection may be displayed on the screen. Reference number 2, which is one of interface screens, is a function provided by OpenFace with a correctly cropped image on the tracked face using a swap algorithm. A screen indicated by reference numeral 3 is a cropped ROI form of a corresponding point of an image in order to track an area ratio of the triangle of the face, and is implemented such that the ratio of a face area is recorded continuously in real time driving. In this system, screen 4 stores tracked data in real time, and is implemented to extract information such as total landmarks (vertex), mapping AU, face ROI, and so on for data analysis.

FIG. 23 is a block diagram showing a schematic configuration of a system to which the present invention is applied.

A camera for photographing a subject 100 is a moving picture camera, for example, a webcam or a web camera 110. A moving picture from the web camera 110 is processed by a processing device 120. The processing device 120 has software to perform the method as described above and a hardware system that supports the software. Such a processing device 120 may be a general purpose computer or dedicated device that includes a computer-based device, e.g., software containing the methods or algorithms described above, and hardware on which the software may be run. A processing result of the processing device 120 as described above is displayed by a display device 130. The system as described above may further include a general external interface device including a general input, for example, a keyboard, a mouse, and the like.

Although a number of matters have been specifically described in the above description, they should not be construed as limiting the scope of the disclosure, but rather should be construed as examples of specific embodiments. For example, one of ordinary skill in the art will appreciate that various modifications and adaptations will be possible. While one or more embodiments have been described with reference to the figures, it will be understood by one of ordinary skill in the art that various changes in form and details may be made therein without departing from the spirit and scope as defined by the following claims.

What is claimed is:

1. A method of extracting facial movement information, the method comprising:
    obtaining an image of a subject's face with a camera;
    defining one or more landmarks on the face of the subject;
    tracking movement of the one or more landmarks in the image;
    extracting raw data on facial movement from movement information of at least one landmark;
    detecting macro movement data from the raw data; and
    removing the macro movement data from the raw data to obtain refined micro movement data,
    wherein the macro movement data is extracted from trend data extracted by a moving average method using raw data (Dr) of a certain window size (time interval), and trend data (Dt) and detrend data (Ddt) are obtained from sample data (Pm) by the following equation to cancel noise due to macro movement from the raw data (Dr)

$$Dt = \frac{Pm + Pm_{+1} + \ldots + Pm_{+n}}{size}$$

$$= \frac{1}{n} \sum_{i=size}^{n} Pm - i$$

$$idx = (size/2) + 1$$

$$Ddt = \left( \sum_{i=time}^{n} (Dr[idx]/Dt[idx]) - 1 \right)^{idx+time}$$

$Pm$ = sample data (raw data = Frame distace)

size = window size × 30 fps $idx$ = Centered Moving Average index time = Real Time Input.

2. The method of claim 1, wherein the movement information of the one or more landmarks is extracted from a difference between coordinates of corresponding landmarks in front and rear frames.

3. The method of claim 2, wherein the macro movement data is extracted from trend data extracted by a moving average method using raw data of a certain window size (time interval).

4. The method of claim 3, wherein the window size (time interval) is in the range of 1.5 seconds to 2.5 seconds.

5. The method of claim 1, the method comprising:
applying a value of the detrend data to the micro movement data when a value of the detrend data (Ddt) is greater than zero, and applying the sample data (Pm) to the micro movement data when the value of the detrend data (Ddt) is not greater than zero.

6. An apparatus for extracting facial movement information, the apparatus comprising:
a camera for capturing an image of a face of a subject;
a processing device for processing the image of the face from the camera according to the method of claim 1; and
a display for displaying a result of processing of a signal of the image, wherein the processing device is configured to define one or more landmarks on the face of the subject and to track movement of the landmarks in the image, raw data (Dr) is obtained from movement information of at least one landmark designated on the face of the subject, and trend data (Dt) and detrend data (Ddt) are obtained from sample data (Pm) by the following Equation to cancel noise due to macro movement from the raw data (Dr):

$$Dt = \frac{Pm + Pm_{+1} + \ldots + Pm_{+n}}{size}$$

$$= \frac{1}{n} \sum_{i=size}^{n} Pm - i$$

$$idx = (size/2) + 1$$

$$Ddt = \left( \sum_{i=time}^{n} (Dr[idx]/Dt[idx]) - 1 \right)^{idx+time}$$

$Pm$ = sample data (raw data = Frame distace)

size = window size × 30 fps $idx$ = Centered Moving Average index time = Real Time Input.

7. The apparatus of claim 6, wherein the movement information of the one or more landmarks is extracted from a difference between coordinates of corresponding landmarks in front and rear frames.

8. The apparatus of claim 6, wherein the macro movement data is extracted from trend data extracted by a moving average method using the raw data of a certain window size (time interval).

9. The apparatus of claim 8, wherein the time interval is in the range of 1.5 seconds to 2.5 seconds.

10. The apparatus of claim 6, wherein the apparatus is configured to:
apply a value of the detrend data to micro movement data when a value of the detrend data (Ddt) is greater than zero, and apply the sample data (Pm) to the micro movement data when the value of the detrend data (Ddt) is not greater than zero.

* * * * *